United States Patent
Kawai et al.

(10) Patent No.: US 11,271,242 B2
(45) Date of Patent: Mar. 8, 2022

(54) LITHIUM ION SECONDARY BATTERY

(71) Applicant: KABUSHIKI KAISHA TOYOTA JIDOSHOKKI, Kariya (JP)

(72) Inventors: Tomoyuki Kawai, Kariya (JP); Takeshi Maki, Kariya (JP); Yuki Ichikawa, Kariya (JP); Shunya Sakamoto, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 7 days.

(21) Appl. No.: 16/093,219

(22) PCT Filed: Apr. 14, 2017

(86) PCT No.: PCT/JP2017/015217
§ 371 (c)(1),
(2) Date: Oct. 12, 2018

(87) PCT Pub. No.: WO2017/179681
PCT Pub. Date: Oct. 19, 2017

(65) Prior Publication Data
US 2019/0386338 A1 Dec. 19, 2019

(30) Foreign Application Priority Data
Apr. 15, 2016 (JP) .............................. JP2016-081796

(51) Int. Cl.
*H01M 10/0525* (2010.01)
*H01M 4/131* (2010.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
CPC .. H01M 10/0525; H01M 4/131; H01M 4/133; H01M 4/386; H01M 4/661
See application file for complete search history.

(56) References Cited

U.S. PATENT DOCUMENTS 7,223,502 B2  5/2007  Onuki
7,575,833 B2  8/2009  Kotato et al.
(Continued)

FOREIGN PATENT DOCUMENTS

CN    1653641 A    8/2005
CN  101257131 A    9/2008
(Continued)

OTHER PUBLICATIONS

International Search Report of PCT/JP2017/015217 filed Jul. 18, 2017.
(Continued)

*Primary Examiner* — Jimmy Vo
(74) *Attorney, Agent, or Firm* — Sughrue Mion, PLLC

(57) ABSTRACT

A lithium ion secondary battery having excellent durability is provided. The lithium ion secondary battery includes: a positive electrode including a current collector made from aluminum; a negative electrode; and an electrolytic solution. The electrolytic solution contains an electrolyte including a lithium salt, and a linear carbonate represented by formula (2), the linear carbonate is contained at a mole ratio of 3 to 6 relative to the lithium salt, and the electrolyte includes a first lithium salt represented by formula (1) and a second alkali metal salt; $(R^1X^1)(R^2SO_2)NLi$: formula (1); and $R^{20}OCOOR^{21}$: formula (2).

6 Claims, 6 Drawing Sheets

(51) Int. Cl.
*H01M 4/133* (2010.01)
*H01M 4/38* (2006.01)
*H01M 4/66* (2006.01)
*H01M 4/02* (2006.01)

(52) U.S. Cl.
CPC ........... *H01M 4/386* (2013.01); *H01M 4/661* (2013.01); *H01M 2004/027* (2013.01); *H01M 2004/028* (2013.01); *H01M 2300/0091* (2013.01)

(56) References Cited

U.S. PATENT DOCUMENTS

| | | |
|---|---|---|
| 7,981,553 B2 | 7/2011 | Onuki |
| 8,029,935 B2 | 10/2011 | Onuki |
| 8,101,303 B2 | 1/2012 | Kim et al. |
| 8,551,662 B2 | 10/2013 | Onuki et al. |
| 9,065,146 B2 | 6/2015 | Onuki et al. |
| 2003/0113636 A1* | 6/2003 | Sano ................. H01M 10/0567 429/330 |
| 2005/0118512 A1* | 6/2005 | Onuki ............... H01M 10/0525 429/326 |
| 2007/0238025 A1 | 10/2007 | Onuki et al. |
| 2008/0206650 A1 | 8/2008 | Kim et al. |
| 2010/0021823 A1 | 1/2010 | Onuki et al. |
| 2010/0227226 A1 | 9/2010 | Onuki et al. |
| 2011/0159380 A1 | 6/2011 | Onuki et al. |
| 2011/0229771 A1 | 9/2011 | Onuki et al. |
| 2013/0071731 A1* | 3/2013 | Tokuda ............. H01M 10/0567 429/200 |
| 2013/0224575 A1* | 8/2013 | Kojima ................. H01M 4/133 429/199 |
| 2014/0154591 A1 | 6/2014 | Yokotsuji et al. |
| 2015/0380768 A1 | 12/2015 | Mizuno et al. |
| 2016/0218394 A1 | 7/2016 | Yamada et al. |

FOREIGN PATENT DOCUMENTS

| | | |
|---|---|---|
| CN | 102544584 A | 7/2012 |
| JP | 2013-134922 A | 7/2013 |
| JP | 2013-149477 A | 8/2013 |
| JP | 2014-110235 A | 6/2014 |
| WO | 2013/128559 A1 | 9/2013 |
| WO | 2014/126256 A1 | 8/2014 |
| WO | 2015/045389 A1 | 4/2015 |

OTHER PUBLICATIONS

Communication dated Jan. 5, 2021, from the State Intellectual Property Office of the P.R.C. in application No. 201780023602.0.

* cited by examiner

LITHIUM ION SECONDARY BATTERY

This application is a National Stage of International Application No. PCT/JP2017/015217 filed Apr. 14, 2017, claiming priority based on Japanese Patent Application No. 2016-081796 filed Apr. 15, 2016.

TECHNICAL FIELD

The present invention relates to a lithium ion secondary battery.

BACKGROUND ART

Generally, a power storage device such as a secondary battery includes, as main components, a positive electrode, a negative electrode, and an electrolytic solution. In the electrolytic solution, an appropriate electrolyte is added at an appropriate concentration range. For example, in an electrolytic solution of a lithium ion secondary battery, a lithium salt such as $LiClO_4$, $LiAsF_6$, $LiPF_6$, $LiBF_4$, $CF_3SO_3Li$, and $(CF_3SO_2)_2NLi$ is commonly added as an electrolyte, and the concentration of the lithium salt in the electrolytic solution is generally set at approximately 1 mol/L.

In an organic solvent to be used in an electrolytic solution, an organic solvent having a high relative permittivity and a high dipole moment such as ethylene carbonate or propylene carbonate is generally mixed by approximately 30 vol % or greater, in order to suitably dissolve an electrolyte.

Actually, Patent Literature 1 discloses a lithium ion secondary battery using an electrolytic solution that uses a mixed organic solvent containing ethylene carbonate by 33 vol % and that contains $LiPF_6$ at a concentration of 1 mol/L.

Patent Literature 2 discloses a lithium ion secondary battery using an electrolytic solution that uses a mixed organic solvent containing ethylene carbonate and propylene carbonate by 66 vol % and that contains $(CF_3SO_2)_2NLi$ at a concentration of 1 mol/L.

As described in Patent Literature 1 and Patent Literature 2, conventionally, in an electrolytic solution to be used in a lithium ion secondary battery, using a mixed organic solvent containing an organic solvent having a high relative permittivity and a high dipole moment, such as ethylene carbonate or propylene carbonate, by approximately 30 vol % or greater and containing a lithium salt at a concentration of approximately 1 mol/L were common technical knowledge.

In Patent Literature 3, the present inventors have disclosed an electrolytic solution containing a metal salt at a higher concentration than conventional electrolytic solutions, and have reported that, in this electrolytic solution, a cluster obtained by coordinating the metal salt and an organic solvent with each other is speculated to be formed, and, the cation and the anion of the metal salt are speculated to mainly form an SSIP (Solvent-separated ion pairs) state in a low-concentration electrolytic solution, and mainly form a CIP (Contact ion pairs) state or an AGG (aggregate) state with an increase in the concentration of the metal salt.

As reported in many documents, aluminum is generally used for the current collectors of the positive electrodes of lithium ion secondary batteries.

CITATION LIST

Patent Literature

Patent Literature 1: JP2013-149477 (A)
Patent Literature 2: JP2013-134922 (A)
Patent Literature 3: WO2015/045389

SUMMARY OF INVENTION

Technical Problem

Further improvement in performance has been required for lithium ion secondary batteries from the industry. The present invention has been made in view of these circumstances, and an object of the present invention is to provide a lithium ion secondary battery having excellent durability.

Solution to Problem

The present inventors have conducted further investigation regarding a lithium ion secondary battery including an electrolytic solution containing a lithium salt at a relatively higher concentration than conventional electrolytic solutions. As a result, the present inventors have found that the lithium ion secondary battery has an excellent capacity retention rate when an upper limit use voltage is set to approximately 4 V, that is, a positive electrode upper limit potential based on Li is set to approximately 4.1 V, and the lithium ion secondary battery is operated in a set voltage range, but elution of aluminum from a current collector made from aluminum is observed when the lithium ion secondary battery is exposed to, for example, a voltage exceeding a set voltage range of not less than 4.6 V due to overcharge or the like.

As a result of thorough investigation by the present inventors, the present inventors have found that elution of aluminum from a current collector is suppressed with an electrolytic solution in which a plurality of specific salts are blended as electrolytes. On the basis of this finding, the present inventors have completed the present invention.

A lithium ion secondary battery of the present invention is a lithium ion secondary battery comprising: a positive electrode including a current collector made from aluminum; a negative electrode; and an electrolytic solution, wherein the electrolytic solution contains an electrolyte including a lithium salt, and a linear carbonate represented by general formula (2) below, the linear carbonate is contained at a mole ratio of 3 to 6 relative to the lithium salt, and the electrolyte includes a first lithium salt represented by general formula (1) below and an alkali metal salt selected from general formulas (A) to (D) below, and/or the electrolytic solution contains an electrolyte including a lithium salt, and a linear carbonate represented by general formula (2) below, the lithium salt has a concentration of 1.5 to 3 mol/L, and the electrolyte includes a first lithium salt represented by general formula (1) below and an alkali metal salt selected from general formulas (A) to (D) below.

$$(R^1X^1)(R^2SO_2)NLi \qquad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.)

$$MPF_{6-y}(X)_y \text{ (y is an integer from 0 to 5)} \quad \text{general formula (A)}$$

$$MBF_{4-y}(X)_y \text{ (y is an integer from 0 to 3)} \quad \text{general formula (B)}$$

$$MAsF_{6-y}(X)_y \text{ (y is an integer from 0 to 5)} \quad \text{general formula (C)}$$

$$M_2SiF_{6-y}(X)_y \text{ (y is an integer from 0 to 5)} \quad \text{general formula (D)}$$

(In general formulas (A) to (D), M is selected from alkali metals. Each X is independently selected from Cl, Br, I, CN, $(OCOCOO)_{1/2}$, and $C_nF_{2n+1}$ (n is an integer from 1 to 3).)

$$R^{20}OCOOR^{21} \quad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j.)

Advantageous Effects of Invention

The lithium ion secondary battery of the present invention has excellent durability.

DESCRIPTION OF EMBODIMENTS

Figure 1:
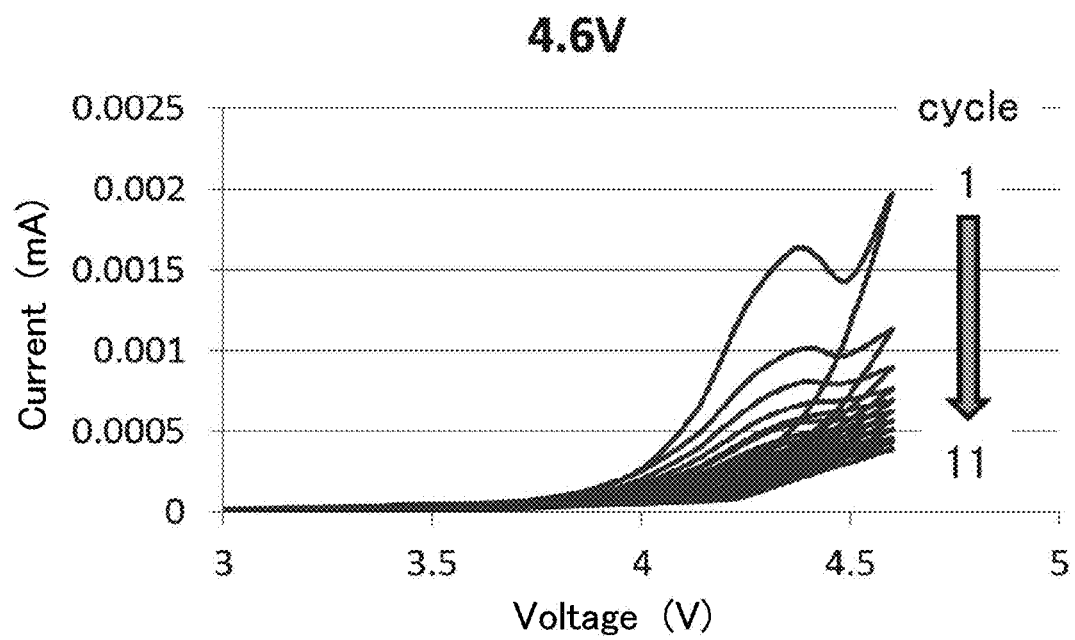
FIG. 1 is a graph showing the relationship between potential (3.1 to 4.6 V) and response current in a coin cell of Example 2-1.

The following describes embodiments of the present invention. Unless mentioned otherwise in particular, a numerical value range of "a to b (or, a-b)" described in the present specification includes, in the range thereof, a lower limit "a" and an upper limit "b". A numerical value range is formed by arbitrarily combining such upper limit values, lower limit values, and numerical values described in Examples. In addition, numerical values arbitrarily selected within a numerical value range may be used as upper limit and lower limit numerical values.

The lithium ion secondary battery of the present invention is a lithium ion secondary battery including: a positive electrode including a current collector made from aluminum; a negative electrode; and an electrolytic solution, wherein the electrolytic solution contains an electrolyte including a lithium salt, and a linear carbonate represented by general formula (2) below, the linear carbonate is contained at a mole ratio of 3 to 6 relative to the lithium salt, and the electrolyte includes a first lithium salt represented by general formula (1) below and an alkali metal salt selected from general formulas (A) to (D) below, and/or the electrolytic solution contains an electrolyte including a lithium salt, and a linear carbonate represented by general formula (2) below, the lithium salt has a concentration of 1.5 to 3 mol/L, and the electrolyte includes a first lithium salt represented by general formula (1) below and an alkali metal salt selected from general formulas (A) to (D) below.

$$(R^1X^1)(R^2SO_2)NLi \quad \text{general formula (1)}$$

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.)

$MPF_{6-y}(X)_y$ (y is an integer from 0 to 5)     general formula (A)

$MBF_{4-y}(X)_y$ (y is an integer from 0 to 3)     general formula (B)

$MAsF_{6-y}(X)_y$ (y is an integer from 0 to 5)     general formula (C)

$M_2SiF_{6-y}(X)_y$ (y is an integer from 0 to 5)     general formula (D)

(In general formulas (A) to (D), M is selected from alkali metals. Each X is independently selected from Cl, Br, I, CN, $(OCOCOO)_{1/2}$, and $C_nF_{2n+1}$ (n is an integer from 1 to 3).)

$R^{20}OCOOR^{21}$     general formula (2)

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j.).

Hereinafter, the electrolytic solution used in the lithium ion secondary battery of the present invention is referred to as electrolytic solution of the present invention. The electrolytic solution of the present invention is an electrolytic solution containing an electrolyte including a lithium salt, and a linear carbonate represented by the above general formula (2), the linear carbonate being contained at a mole ratio of 3 to 6 relative to the lithium salt, the electrolyte including a first lithium salt represented by the above general formula (1) and an alkali metal salt selected from the above general formulas (A) to (D), and/or an electrolytic solution containing an electrolyte including a lithium salt, and a linear carbonate represented by general formula (2) below, the lithium salt having a concentration of 1.5 to 3 mol/L, the electrolyte including a first lithium salt represented by general formula (1) below and an alkali metal salt selected from general formulas (A) to (D) below.

First, the electrolyte is described. The electrolyte includes a first lithium salt represented by the above general formula (1) and an alkali metal salt selected from the above general formulas (A) to (D).

The wording of "optionally substituted with a substituent group" in the chemical structures represented by the above described general formula (1) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, silyl group, etc. These substituent groups may be further substituted with a substituent group. In addition, when two or more substituent groups are present, the substituent groups may be identical or different from each other.

The first lithium salt represented by general formula (1) is preferably a lithium salt represented by general formula (1-1) below.

$(R^3X^2)(R^4SO_2)NLi$     general formula (1-1)

($R^3$ and $R^4$ are each independently $C_nH_aF_bCl_cBr_dI_e(CN)_f(SCN)_g(OCN)_h$.

"n", "a", "b", "c", "d", "e", "f", "g", and "h" are each independently an integer not smaller than 0, and satisfy 2n+1=a+b+c+d+e+f+g+h.

$R^3$ and $R^4$ optionally bind with each other to form a ring, and, in that case, satisfy 2n=a+b+c+d+e+f+g+h.

$X^2$ is selected from $SO_2$, C=O, C=S, $R^cP$=O, $R^dP$=S, S=O, or Si=O.

$R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^c$ and $R^d$ each optionally bind with $R^3$ or $R^4$ to form a ring.)

In the chemical structure represented by the general formula (1-1), the meaning of the wording of "optionally substituted with a substituent group" is synonymous with that described for the general formula (1).

In the chemical structure represented by the general formula (1-1), "n" is preferably an integer from 0 to 6, more preferably an integer from 0 to 4, and particularly preferably an integer from 0 to 2. In the chemical structure represented by the general formula (1-1), when $R^3$ and $R^4$ each optionally bind with each other to form a ring, "n" is preferably an integer from 1 to 8, more preferably an integer from 1 to 7, and particularly preferably an integer from 1 to 3.

The first lithium salt represented by general formula (1) is further preferably a lithium salt represented by general formula (1-2) below.

$(R^5SO_2)(R^6SO_2)NLi$   general formula (1-2)

($R^5$ and $R^6$ are each independently $C_nH_aF_bCl_cBr_dI_e$.

"n", "a", "b", "c", "d", and "e" are each independently an integer not smaller than 0, and satisfy $2n+1=a+b+c+d+e$.

$R^5$ and $R^6$ optionally bind with each other to form a ring, and, in that case, satisfy $2n=a+b+c+d+e$.)

In the chemical structure represented by the general formula (1-2), "n" is preferably an integer from 0 to 6, more preferably an integer from 0 to 4, and particularly preferably an integer from 0 to 2. In the chemical structure represented by the general formula (1-2), when $R^5$ and $R^6$ each optionally bind with each other to form a ring, "n" is preferably an integer from 1 to 8, more preferably an integer from 1 to 7, and particularly preferably an integer from 1 to 3.

In addition, in the chemical structure represented by the general formula (1-2), those in which "a," "c," "d," and "e" are 0 are preferable.

The first lithium salt represented by general formula (1) is particularly preferably $(CF_3SO_2)_2NLi$ (hereinafter, sometimes referred to as "LiTFSA"), $(FSO_2)_2NLi$ (hereinafter, sometimes referred to as "LiFSA"), $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As for the first lithium salt represented by general formula (1) in the electrolytic solution of the present invention, a single type may be used, or a combination of two or more types may be used.

Next, the alkali metal salt selected from general formulas (A) to (D) (hereinafter, sometimes referred to merely as "alkali metal salt") is described. These alkali metal salts have F that is eliminated as $F^-$. $F^-$ reacts with aluminum to form stable Al—F bonds. Therefore, in the lithium ion secondary battery of the present invention, the surface of the current collector made from aluminum is considered to be protected by a passive film including Al—F bonds. The existence of the passive film including Al—F bonds is considered to be one factor for suppressing elution of aluminum from the current collector.

From the viewpoint of formation of the above passive film, M in general formulas (A) to (D) only needs to be an alkali metal, and may be one metal selected from lithium, sodium, potassium, rubidium, cesium, and francium, or may be a plurality of metals selected therefrom. In addition, in general formulas (A) to (D), the number of F atoms in general formulas (A) to (D) is preferably larger.

The present invention is a lithium ion secondary battery having lithium ions as a charge carrier, and thus lithium salts in which M in general formulas (A) to (D) is lithium are suitable. Specific examples of suitable lithium salts include $LiPF_6$, $LiPF_2(OCOCOO)_2$, $LiBF_4$, $LiAsF_6$, and $Li_2SiF_6$.

As for the alkali metal salt in the electrolytic solution of the present invention, a single type included in general formulas (A) to (D) may be used, or a combination of two or more types included in general formulas (A) to (D) may be used.

In the case where M in general formulas (A) to (D) is lithium, the alkali metal salt becomes a second lithium salt. The lithium salt contained in the electrolytic solution of the present invention is both the first lithium salt and the second lithium salt.

The electrolyte in the electrolytic solution of the present invention includes the lithium salt by preferably not less than 80 mass % or 80 mole %, more preferably not less than 90 mass % or 90 mole %, and further preferably not less than 95 mass % or 95 mole %. The entire electrolyte in the electrolytic solution of the present invention may be the lithium salt.

The blending ratio of the first lithium salt and the alkali metal salt is described. Elution of aluminum from the current collector is considered to be suppressed as long as the alkali metal salt exists in the electrolytic solution. On the other hand, the capacity retention rate of the lithium ion secondary battery has been found to significantly decrease when the electrolyte contained in the electrolytic solution is only the alkali metal salt.

Therefore, the present inventors have continued to seek for a blending range of the alkali metal salt in which both an effect of suppressing elution of aluminum from the current collector and an effect of suitably maintaining the capacity of the lithium ion secondary battery are achieved. As a result, the present inventors have found that both of the above effects are suitably exhibited when an electrolytic solution in which the ratio P of the moles of the alkali metal salt relative to the total moles of the first lithium salt and the alkali metal salt satisfies $0<P\leq0.7$ is used. Furthermore, both of the above effects are more suitably exhibited with an electrolytic solution in which the ratio P satisfies $0<P\leq0.5$, or with an electrolytic solution in which the ratio P satisfies $0<P\leq0.3$.

In other words, in the lithium ion secondary battery of the present invention, an electrolytic solution in which the ratio P of the moles of the alkali metal salt relative to the total moles of the first lithium salt and the alkali metal salt satisfies $0<P\leq0.7$ is preferable, an electrolytic solution in which the ratio P satisfies $0<P\leq0.5$ is more preferable, and an electrolytic solution in which the ratio P satisfies $0<P\leq0.3$ is further preferable. If the lower limit of the ratio P is to be shown, examples thereof include $0.01\leq P$, $0.5\leq P$, and $0.1\leq P$. In addition, when more importance is placed on the aluminum elution suppression effect than on the capacity retention rate effect, among electrolytic solutions in which the ratio P satisfies $0<P\leq0.7$, an electrolytic solution in which the ratio P satisfies $0.2\leq P\leq0.7$ is considered to be more preferable, an electrolytic solution in which the ratio P satisfies $0.3\leq P\leq0.7$ is considered to be further preferable, and an electrolytic solution in which the ratio P satisfies 0.4≤P≤0.7 is considered to be particularly preferable.

The electrolytic solution of the present invention contains an organic solvent including a linear carbonate represented by general formula (2).

$$R^{20}OCOOR^{21} \quad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j.)

In the linear carbonates represented by the above general formula (2), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the above represented by general formula (2), those represented by general formula (2-1) below are particularly preferable.

$$R^{22}OCOOR^{23} \quad \text{general formula (2-1)}$$

($R^{22}$ and $R^{23}$ are each independently selected from $C_nH_aF_b$ that is a linear alkyl, or $C_mH_fF_g$ that includes a cyclic alkyl in the chemical structure thereof. "n" is an integer not smaller than 1, "m" is an integer not smaller than 3, and "a", "b", "f", and "g" are each independently an integer not smaller than 0, and satisfy 2n+1=a+b and 2m−1=f+g.)

In the linear carbonates represented by general formula (2-1), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the above general formula (2-1), dimethyl carbonate (hereinafter, sometimes referred to as "DMC"), diethyl carbonate (hereinafter, sometimes referred to as "DEC"), ethyl methyl carbonate (hereinafter, sometimes referred to as "EMC"), fluoromethyl methyl carbonate, difluoromethyl methyl carbonate, trifluoromethyl methyl carbonate, bis(fluoromethyl)carbonate, bis(difluoromethyl)carbonate, bis(trifluoromethyl)carbonate, fluoromethyl difluoromethyl carbonate, 2,2,2-trifluoroethyl methyl carbonate, pentafluoroethyl methyl carbonate, ethyl trifluoromethyl carbonate, and bis(2,2,2-trifluoroethyl)carbonate are particularly preferable.

As for the linear carbonate described above, one type may be used in the electrolytic solution, or a plurality of types may be used in combination in the electrolytic solution. When a plurality of linear carbonates are used in combination, low-temperature fluidity, lithium ion transport at a low temperature, and the like of the electrolytic solution are suitably ensured.

The electrolytic solution of the present invention may contain another organic solvent usable in electrolytic solutions for lithium ion secondary batteries and the like (hereinafter, sometimes referred to merely as "another organic solvent"), in addition to the linear carbonate.

In the electrolytic solution of the present invention, the linear carbonate is contained, relative to the entire organic solvent contained in the electrolytic solution of the present invention, by preferably not less than 70 mass % or 70 mole %, more preferably not less than 80 mass % or 80 mole %, further preferably not less than 90 mass % or 90 mole %, and particularly preferably not less than 95 mass % or 95 mole %. The entire organic solvent contained in the electrolytic solution of the present invention may be the linear carbonate.

In some cases, the electrolytic solution of the present invention containing another organic solvent in addition to the linear carbonate has an increased viscosity or a reduced ionic conductivity compared to the electrolytic solution of the present invention not containing another organic solvent. Furthermore, in some cases, a secondary battery using the electrolytic solution of the present invention containing another organic solvent in addition to the linear carbonate has an increased reaction resistance.

Specific examples of the other organic solvent include: nitriles such as acetonitrile, propionitrile, acrylonitrile, and malononitrile; ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers; cyclic carbonates such as ethylene carbonate and propylene carbonate; amides such as formamide, N,N-dimethylformamide, N,N-dimethylacetamide, and N-methylpyrrolidone; isocyanates such as isopropyl isocyanate, n-propylisocyanate, and chloromethyl isocyanate; esters such as methyl acetate, ethyl acetate, butyl acetate, propyl acetate, methyl propionate, methyl formate, ethyl formate, vinyl acetate, methyl acrylate, and methyl methacrylate; epoxies such as glycidyl methyl ether, epoxy butane, and 2-ethyloxirane; oxazoles such as oxazole, 2-ethyloxazole, oxazoline, and 2-methyl-2-oxazoline; ketones such as acetone, methyl ethyl ketone, and methyl isobutyl ketone; acid anhydrides such as acetic anhydride and propionic anhydride, sulfones such as dimethyl sulfone and sulfolane; sulfoxides such as dimethyl sulfoxide, nitros such as 1-nitropropane and 2-nitropropane, furans such as furan and furfural; cyclic esters such as γ-butyrolactone, γ-valerolactone, and δ-valerolactone; aromatic heterocycles such as thiophene and pyridine, heterocycles such as tetrahydro-4-pyrone, 1-methylpyrrolidine, and N-methylmorpholine; and phosphoric acid esters such as trimethyl phosphate and triethyl phosphate.

Compared to a cyclic carbonate such as ethylene carbonate which has been used in a conventional electrolytic solution, the linear carbonate represented by general formula (2) has a low polarity. Therefore, the affinity between the linear carbonate and metal ions is considered to be inferior compared to the affinity between the cyclic carbonate and metal ions. Then, when the electrolytic solution of the present invention is used as the electrolytic solution for a secondary battery, aluminum or a transition metal forming an electrode of the secondary battery is considered less likely to be dissolved as ions into the electrolytic solution of the present invention.

Here, regarding a secondary battery using a conventional general electrolytic solution, a possible case is known in which: aluminum or a transition metal forming the positive electrode enters a high oxidation state particularly in a high-voltage charging environment, and dissolves (anode elution) in the form of metal ions, which are positive ions, into the electrolytic solution; and then, the metal ions eluted in the electrolytic solution are attracted to the electron-rich negative electrode by electrostatic attraction, to bind with electrons on the negative electrode, thereby to be reduced and deposited in the form of metal. If such a reaction occurs, the performance of the battery is known to be reduced due to possible occurrence of decrease in the capacity of the positive electrode, degradation of the electrolytic solution on the negative electrode, and the like. However, the electrolytic solution of the present invention has the features described in the former paragraphs, and thus, in a secondary battery using the electrolytic solution of the present invention, metal ion elution from the positive electrode and metal deposition on the negative electrode are suppressed.

Therefore, the existence of the linear carbonate represented by general formula (2) is also considered to be one factor for suppressing elution of aluminum from the current collector.

In the electrolytic solution of the present invention, the linear carbonate represented by general formula (2) is contained at a mole ratio of 3 to 6 relative to the lithium salt. The ionic conductivity of the electrolytic solution of the present invention becomes more suitable if the mole ratio is in the above range. The mole ratio in the present specification means the value obtained by dividing the former by the latter, i.e., (the number of moles of the linear carbonate represented by general formula (2) contained in the electrolytic solution of the present invention)/(the number of moles of the lithium salt contained in the electrolytic solution of the present invention) (hereinafter, sometimes abbreviated merely as "mole ratio" when the relationship between the linear carbonate and the lithium salt is described). More preferable ranges of the mole ratio in the electrolytic solution of the present invention include a range of 3 to 5, a range of 3.2 to 4.8, and a range of 3.5 to 4.5. In addition, from the viewpoint of resistance change, the mole ratio is preferably in a range of 3 to 5 and more preferably in a range of 4 to 5. In conventional electrolytic solutions, the mole ratio of the organic solvent to the electrolyte is approximately 10.

In the electrolytic solution of the present invention in which the above mole ratio is 3 to 6, the concentration of the lithium salt is high compared to that in conventional electrolytic solutions. Furthermore, such an electrolytic solution of the present invention has an advantage that variation in the ionic conductivity is small when some variation occurs in the lithium salt concentration, that is, an advantage of having good fastness. Moreover, the linear carbonate represented by the above general formula (2) is excellent in stability against oxidation and reduction. Furthermore, the linear carbonate represented by the above general formula (2) has a flexible chemical structure in which many bindings capable of free rotation exist. Thus, even when the electrolytic solution of the present invention using the linear carbonate contains a high concentration of a lithium salt, significant increase in the viscosity thereof is suppressed, and high ionic conductivity is obtained.

Additionally, in the electrolytic solution of the present invention, the environment in which the lithium salt and the organic solvent exist is considered to be different from that in conventional electrolytic solutions. Therefore, in a lithium ion secondary battery including the electrolytic solution of the present invention, improvement in lithium ion transportation rate in the electrolytic solution, improvement in reaction rate at the interface between an electrode and the electrolytic solution, mitigation of uneven distribution of lithium salt concentration of the electrolytic solution caused when the secondary battery undergoes high-rate charging and discharging, improvement in liquid retaining property of the electrolytic solution at an electrode interface, suppression of a so-called liquid run-out state of lacking the electrolytic solution at an electrode interface, and the like are expected. Furthermore, in the electrolytic solution of the present invention, the vapor pressure of the organic solvent contained in the electrolytic solution becomes low. As a result, volatilization of the organic solvent from the electrolytic solution of the present invention is reduced.

The distance between adjacent lithium ions is extremely small within the electrolytic solution of the present invention. When a lithium ion moves between the positive electrode and the negative electrode during charging and discharging of the secondary battery, a lithium ion located closest to an electrode that is a movement destination is firstly supplied to the electrode. Then, another lithium ion adjacent to the lithium ion moves to the place where the supplied lithium ion had been located. Thus, in the electrolytic solution of the present invention, a domino toppling-like phenomenon is predicted to be occurring in which adjacent lithium ions sequentially change their positions one by one toward an electrode that is a supply target. Because of that, the distance for which a lithium ion moves during charging and discharging is considered to be short, so that the movement speed of the lithium ion is considered to be high. For this reason, the secondary battery having the electrolytic solution of the present invention is considered to have a high reaction rate.

One mode of the electrolytic solution of the present invention is an electrolytic solution containing an electrolyte including a lithium salt, and a linear carbonate represented by the above general formula (2), the lithium salt having a concentration of 1.5 to 3 mol/L, the electrolyte including a first lithium salt represented by general formula (1) below and an alkali metal salt selected from the above general formulas (A) to (D). Examples of a preferable concentration of the lithium salt include 1.6 to 2.9 mol/L and 1.7 to 2.5 mol/L. From the viewpoint of suppression of aluminum elution, the concentration of the alkali metal salt is preferably not less than 1.0 mol/L. From the viewpoint of capacity retention rate, the concentration of the first lithium salt is preferably not less than 0.5 mol/L, more preferably not less than 1 mol/L, further preferably not less than 1.5 mol/L, and particularly preferably not less than 2 mol/L. In addition, from the viewpoint of resistance change, the concentration of the lithium salt is preferably 1.8 to 3 mol/L and more preferably 1.8 to 2.2 mol/L.

Among the electrolytic solutions of the present invention, an example of a particularly preferable electrolytic solution is an electrolytic solution in which a mole ratio is 3 to 6 and/or a concentration of the lithium salt is 1.5 to 3 mol/L, $0<P\leq0.7$ is satisfied, and the concentration of the alkali metal salt or the second lithium salt is not less than 1.0 mol/L.

The electrolytic solution of the present invention is preferably an electrolytic solution containing a fluorine-containing cyclic carbonate. The fluorine-containing cyclic carbonate refers to a cyclic carbonate having fluorine in the molecule thereof. Because of the existence of the fluorine-containing cyclic carbonate, elution of aluminum is more suitably suppressed. The amount of the fluorine-containing cyclic carbonate relative to the entire organic solvent contained in the electrolytic solution is preferably in a range of 0.01 to 15 mole % or mass %, more preferably in a range of 0.01 to 10 mole % or mass %, further preferably in a range of 0.1 to 9 mole % or mass %, and particularly preferably in a range of 1 to 8 mole % or mass %.

Specific examples of the fluorine-containing cyclic carbonate include compounds represented by general formula (3) below.

general formula (3)

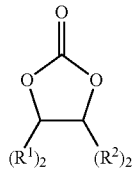

[Chem. 1]

($R^1$ and $R^2$ are each independently hydrogen, an alkyl group, a halogen-substituted alkyl group, or a halogen. At least one of each $R^1$ and each $R^2$ includes F.)

Examples of specific compound names of the fluorine-containing cyclic carbonates represented by general formula (3) include fluoroethylene carbonate, 4-(trifluoromethyl)-1,3-dioxolane-2-on, 4,4-difluoro-1,3-dioxolane-2-on, 4-fluoro-4-methyl-1,3-dioxolane-2-on, 4-(fluoromethyl)-1,3-dioxolane-2-on, 4,5-difluoro-1,3-dioxolane-2-on, 4-fluoro-5-methyl-1,3-dioxolane-2-on, and 4,5-difluoro-4,5-dimethyl-1,3-dioxolane-2-on. Among those described above, fluoroethylene carbonate is preferable.

When the electrolytic solution of the present invention is mixed with a polymer or an inorganic filler to form a mixture, the mixture enables containment of the electrolytic solution to provide a pseudo solid electrolyte. By using the pseudo solid electrolyte as an electrolytic solution of a battery, leakage of the electrolytic solution in the battery is suppressed.

As the polymer, a polymer used in batteries such as lithium ion secondary batteries and a general chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate, polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nm order are particularly preferable.

Examples of the types of the inorganic ceramics include common alumina, silica, titania, zirconia, and lithium phosphate. In addition, inorganic ceramics that have lithium conductivity themselves may be used, and specific examples thereof include $Li_3N$, LiI, LiI—$Li_3N$—LiOH, LiI—$Li_2S$—$P_2O_5$, LiI—$Li_2S$—$P_2S_5$, LiI—$Li_2S$—$B_2S_3$, $Li_2O$—$B_2S_3$, $Li_2O$—$V_2O_3$—$SiO_2$, $Li_2O$—$B_2O_3$—$P_2O_5$, $Li_2O$—$B_2O_3$—ZnO, $Li_2O$—$Al_2O_3$—$TiO_2$—$SiO_2$—$P_2O_5$, $LiTi_2(PO_4)_3$, Li-$\beta Al_2O_3$, and $LiTaO_3$.

Glass ceramics may be used as the inorganic filler. Since glass ceramics enables containment of ionic liquids, the same effect is expected for the electrolytic solution of the present invention. Examples of the glass ceramics include compounds represented by $xLi_2S$-$(1-x)P_2S_5$ ($0<x<1$), and those in which one portion of S in the compound is substituted with another element and those in which one portion of P in the compound is substituted with germanium.

In addition, without departing from the gist of the present invention, a known additive may be added to the electrolytic solution of the present invention. Examples of such a known additive include: cyclic carbonates having unsaturated bonds represented by vinylene carbonate (VC), vinyl ethylene carbonate (VEC), methyl vinylene carbonate (MVC), and ethyl vinylene carbonate (EVC); carbonate compounds represented by phenylethylene carbonate and erythritane carbonate; carboxylic anhydrides represented by succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; lactones represented by γ-butyrolactone, γ-valerolactone, γ-caprolactone, δ-valerolactone, δ-caprolactone, and ε-caprolactone; cyclic ethers represented by 1,4-dioxane; sulfur-containing compounds represented by ethylene sulfite, 1,3-propanesultone, 1,4-butanesultone, methyl methanesulfonate, busulfan, sulfolane, sulfolene, dimethylsulfone, and tetramethylthiuram monosulfide; nitrogen-containing compounds represented by 1-methyl-2-pyrrolidinone, 1-methyl-2-piperidone, 3-methyl-2-oxazolidinone, 1,3-dimethyl-2-imidazolidinone, and N-methylsuccinimide; phosphates represented by monofluorophosphate and difluorophosphate; saturated hydrocarbon compounds represented by heptane, octane, and cycloheptane; and unsaturated hydrocarbon compounds represented by biphenyl, alkyl biphenyl, terphenyl, partially hydrogenated terphenyl, cyclohexylbenzene, t-butylbenzene, t-amyl benzene, diphenyl ether, and dibenzofuran.

In the following, the lithium ion secondary battery of the present invention including the electrolytic solution of the present invention is described.

The lithium ion secondary battery of the present invention includes: a negative electrode having a negative electrode active material capable of occluding and releasing lithium ions; a positive electrode having a positive electrode active material capable of occluding and releasing lithium ions; and the electrolytic solution of the present invention.

As the negative electrode active material, a material capable of occluding and releasing lithium ions is used. Thus, the material is not limited in particular as long as the material is an elemental substance, an alloy, or a compound capable of occluding and releasing lithium ions. For example, an elemental substance from among Li, group 14 elements such as carbon, silicon, germanium, and tin, group 13 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. When silicon or the like is used as the negative electrode active material, a high capacity active material is obtained since a single silicon atom reacts with multiple lithium atoms. However, a problem that a significant expansion and contraction of volume is caused in association with occlusion and release of lithium may occur. Thus, in order to reduce the possibility of occurrence of the problem, an alloy or a compound obtained by combining an elemental substance of silicon or the like with another element such as a transition metal is suitably used as the negative electrode active material. Specific examples of the alloy or the compound include tin-based materials such as Ag—Sn alloys, Cu—Sn alloys, and Co—Sn alloys, carbon based materials such as various graphites, silicon based materials such as $SiO_x$ ($0.3 \le x \le 1.6$) that undergoes disproportionation into the elemental substance silicon and silicon dioxide, and a complex obtained by combining a carbon based material with elemental substance silicon or a silicon based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. With regard to the negative electrode active material, one or more types described above may be used.

A more specific example of the negative electrode active material is a graphite whose G/D ratio is not lower than 3.5. The G/D ratio is the ratio of G-band and D-band peaks in a Raman spectrum. In the Raman spectrum of graphite, G-band is observed near 1590 $cm^1$ and D-band is observed near 1350 $cm^1$, as peaks, respectively. G-band is derived from a graphite structure and D-band is derived from defects. Thus, having a higher G/D ratio, which is the ratio of G-band and D-band, means the graphite has higher crystallinity with fewer defects. Hereinafter, a graphite whose G/D ratio is not lower than 3.5 is sometimes referred to as a high-crystallinity graphite, and a graphite whose G/D ratio is lower than 3.5 is sometimes referred to as a low-crystallinity graphite.

As such a high-crystallinity graphite, both natural graphites and artificial graphites may be used. When a classification method based on shape is used, flake-like graphites, spheroidal graphites, block-like graphite, earthy graphites, and the like may be used. In addition, coated graphites obtained by coating the surface of a graphite with a carbon material or the like may also be used.

Examples of specific negative electrode active materials include carbon materials whose crystallite size is not larger than 20 nm, and preferably not larger than 5 nm. A larger crystallite size means that the carbon material has atoms arranged periodically and precisely in accordance with a certain rule. On the other hand, a carbon material whose crystallite size is not larger than 20 nm is considered to have atoms being in a state of poor periodicity and poor preciseness in arrangement. For example, when the carbon material is a graphite, the crystallite size becomes not larger than 20 nm when the size of a graphite crystal is not larger than 20 nm or when atoms forming the graphite are arranged irregularly due to distortion, defects, and impurities, etc.

Representative carbon materials whose crystallite size is not larger than 20 nm include hardly graphitizable carbon, which is so-called hard carbon, and easily graphitizable carbon, which is so-called soft carbon.

In order to measure the crystallite size of the carbon material, an X-ray diffraction method using CuKα radiation as an X-ray source may be used. With the X-ray diffraction method, the crystallite size is calculated using the following Scherrer's equation on the basis of a half width of a diffraction peak detected at a diffraction angle of 2θ=20 degrees to 30 degrees and the diffraction angle.

$$L = 0.94\lambda/(\beta \cos \theta)$$

where
L: crystallite size
λ: incident X-ray wavelength (1.54 angstrom)
β: half width of peak (radian)
θ: diffraction angle.

Specific examples of the negative electrode active material include materials containing silicon. A more specific example is $SiO_x$ ($0.3 \le x \le 1.6$) disproportionated into two phases of Si phase and silicon oxide phase. The Si phase in $SiO_x$ is capable of occluding and releasing lithium ions, and changes in volume associated with charging and discharging of the secondary battery. The silicon oxide phase changes less in volume associated with charging and discharging when compared to the Si phase. Thus, $SiO_x$ as the negative electrode active material achieves higher capacity because of the Si phase, and when the silicon oxide phase is included, suppresses change in volume of the entirety of the negative electrode active material. When "x" becomes smaller than a lower limit value, cycle characteristics of the secondary battery deteriorate since the change in volume during charging and discharging becomes too large due to the ratio of Si becoming excessive. On the other hand, if "x" becomes larger than an upper limit value, energy density is decreased due to the Si ratio being too small. The range of "x" is more preferably $0.5 \le x \le 1.5$, and further preferably $0.7 \le x \le 1.2$.

In $SiO_x$ described above, an alloying reaction between lithium and silicon in the Si phase is considered to occur during charging and discharging of the lithium ion secondary battery. This alloying reaction is considered to contribute to charging and discharging of the lithium ion secondary battery. Also in the negative electrode active material including tin described later, charging and discharging are considered to occur by an alloying reaction between tin and lithium.

One mode of the material containing silicon is a silicon material that is described in WO2014/080608 and has a structure made up of a plurality of plate-like silicon bodies laminated in the thickness direction (hereinafter, referred to merely as "silicon material"). The silicon material is produced, for example, through a step of reacting $CaSi_2$ with an acid to synthesize a layered silicon compound including polysilane as a main component, and a further step of heating the layered silicon compound at 300° C. or higher to remove hydrogen.

The method for producing the silicon material is represented by the following ideal reaction formula in the case of using hydrogen chloride as the acid.

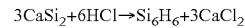

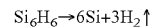

In the upper reaction of synthesizing $Si_6H_6$ which is polysilane, water is normally used as a reaction solvent from the viewpoint of removal of by-products and impurities. $Si_6H_6$ reacts with water, and thus, in the step of synthesizing the layered silicon compound including the upper reaction, the layered silicon compound is rarely produced as a compound of $Si_6H_6$ only, and is produced as a compound represented by $Si_6H_s(OH)_tX_u$ (X is a group or an element derived from the anion of the acid, s+t+u=6, 0<s<6, 0<t<6, 0<u<6). In the above chemical formula, inevitable impurities such as remaining Ca are not taken into consideration. The silicon material obtained by heating the layered silicon compound also includes oxygen and an element derived from the anion of the acid.

As described above, the silicon material has a structure made up of a plurality of plate-like silicon bodies laminated in the thickness direction. For efficient occlusion or release of a charge carrier such as lithium ion, the thickness of each plate-like silicon body is preferably in a range of 10 nm to 100 nm and more preferably in a range of 20 nm to 50 nm. The length of each plate-like silicon body in the longitudinal direction is preferably in a range of 0.1 µm to 50 µm. In addition, regarding each plate-like silicon body, (length in longitudinal direction)/(thickness) is preferably in a range of 2 to 1000. The laminated structure of the plate-like silicon bodies is confirmed by observation with a scanning electron microscope or the like. Moreover, the laminated structure is considered to be derived from the Si layer in $CaSi_2$ which is a raw material.

The silicon material preferably contains amorphous silicon and/or silicon crystallites. In particular, the above plate-like silicon bodies are preferably in a state where silicon crystallites are scattered in the amorphous silicon serving as a matrix. The size of the silicon crystallites is preferably in a range of 0.5 nm to 300 nm, more preferably in a range of 1 nm to 100 nm, further preferably in a range of 1 nm to 50 nm, and particularly preferably in a range 1 nm to 10 nm. The size of the silicon crystallites is calculated in accordance with Scherrer's equation by using the half width of a diffraction peak of the Si (111) plane in an X-ray diffraction chart obtained from an X-ray diffraction measurement conducted on the silicon material.

The existence amounts and the sizes of the plate-like silicon bodies, the amorphous silicon, and the silicon crystallites contained in the silicon material depend mainly on the heating temperature and the heating time. The heating temperature is preferably in a range of 350° C. to 950° C., more preferably in a range of 400° C. to 900° C., and further preferably in a range of 500° C. to 800° C.

As the silicon material, a silicon material coated with carbon may be used. The conductivity of the silicon material is improved by coating the silicon material with carbon.

Specific examples of the negative electrode active material include materials containing tin. More specific examples include Sn elemental substance, tin alloys such as Cu—Sn and Co—Sn, amorphous tin oxides, and tin silicon oxides. Examples of the amorphous tin oxides include $SnB_{0.4}P_{0.6}O_{3.1}$, and examples of the tin silicon oxides include $SnSiO_3$.

The material containing silicon and the material containing tin described above are each preferably made into a composite with a carbon material to be used as the negative electrode active material. By using those materials as a composite, the structure particularly of silicon and/or tin is stabilized, and durability of the negative electrode is improved. Making a composite mentioned above may be performed by a known method. As the carbon material used in the composite, a graphite, a hard carbon, a soft carbon, etc. may be used. The graphite may be a natural graphite or an artificial graphite.

Specific examples of the negative electrode active material include lithium titanate having a spinel structure such as $Li_{4+x}Ti_{5+y}O_{12}$ (−1≤x≤4, −1≤y≤1) and lithium titanate having a ramsdellite structure such as $Li_2Ti_3O_7$.

Specific examples of the negative electrode active material include graphites having a value of long axis/short axis of 1 to 5, and preferably 1 to 3. Here, the long axis means the length of the longest portion of a graphite particle. The short axis means the longest length in directions perpendicular to the long axis. Spheroidal graphites and meso carbon micro beads correspond to the graphite. The spheroidal graphites mean carbon materials which are artificial graphite, natural graphite, easily graphitizable carbon, and hardly graphitizable carbon, for example, and which have spheroidal or substantially spheroidal shapes.

Spheroidal graphite is obtained by grinding graphite into flakes by means of an impact grinder having a relatively small crushing force and by compressing and spheroidizing the flakes. Examples of the impact grinder include a hammer mill and a pin mill. The above operation is preferably performed with the outer-circumference line speed of the hammer or the pin of the mill set at about 50 to 200 m/s. Supply and ejection of graphite with respect to such mills are preferably performed in association with a current of air or the like.

The graphite is preferably have a BET specific surface area in a range of 0.5 to 15 $m^2/g$, and more preferably in a range of 4 to 12 $m^2/g$. When the BET specific surface area is too large, side reaction between the graphite and the electrolytic solution is accelerated in some cases. When the BET specific surface area is too small, reaction resistance of the graphite becomes large in some cases.

The mean particle diameter of the graphite is preferably in a range of 2 to 30 µm, and more preferably in a range of 5 to 20 µm. The mean particle diameter means D50 measured by a general laser diffraction scattering type particle size distribution measuring device.

The negative electrode includes a current collector, and a negative electrode active material layer bound to the surface of the current collector.

The current collector refers to an electron conductor that is chemically inert for continuously sending a flow of current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 µm to 100 µm.

The negative electrode active material layer includes a negative electrode active material, and, if necessary, a binding agent and/or a conductive additive.

The binding agent serves to adhere the active material, the conductive additive, or the like, to the surface of the current collector.

As the binding agent, a known binding agent may be used such as a fluorine-containing resin such as polyvinylidene fluoride, polytetrafluoroethylene, or fluororubber, a thermoplastic resin such as polypropylene or polyethylene, an imide based resin such as polyimide or polyamide-imide, an alkoxysilyl group-containing resin, or a styrene-butadiene rubber.

In addition, a polymer having a hydrophilic group may be used as the binding agent. The secondary battery of the present invention provided with a polymer having a hydrophilic group as the binding agent more suitably maintains the capacity thereof. Examples of the hydrophilic group of the polymer having a hydrophilic group include carboxyl group, sulfogroup, silanol group, amino group, hydroxyl group, and phosphoric acid based group such as phosphoric acid group. Among those described above, a polymer containing a carboxyl group in the molecule thereof, such as polyacrylic acid, carboxymethyl cellulose, and polymethacrylic acid, or a polymer containing a sulfo group such as poly(p-styrenesulfonic acid) is preferable.

A polymer containing a large number of carboxyl groups and/or sulfo groups, such as polyacrylic acid or a copolymer of acrylic acid and vinylsulfonic acid, is water soluble. The polymer containing the hydrophilic group is preferably a water soluble polymer, and is preferably a polymer containing multiple carboxyl groups and/or sulfo groups in a single molecule thereof in terms of the chemical structure.

A polymer containing a carboxyl group in the molecule thereof is produced through, for example, a method of polymerizing an acid monomer or a method of imparting a carboxyl group to a polymer. Examples of the acid monomer include acid monomers having one carboxyl group in respective molecules such as acrylic acid, methacrylic acid, vinylbenzoic acid, crotonic acid, pentenoic acid, angelic acid, and tiglic acid, and acid monomers having two or more carboxyl groups in respective molecules such as itaconic acid, mesaconic acid, citraconic acid, fumaric acid, maleic acid, 2-pentenedioic acid, methylenesuccinic acid, allylmalonic acid, isopropylidene succinic acid, 2,4-hexadienedioic acid, and acetylene dicarboxylic acid.

A copolymer obtained through polymerization of two or more types of acid monomers selected from the acid monomers described above may be used as the binding agent.

For example, as disclosed in JP2013065493(A), a polymer that includes in the molecule thereof an acid anhydride group formed through condensation of carboxyl groups of a copolymer of acrylic acid and itaconic acid is also preferably used as the binding agent. Since the binding agent has a structure derived from a monomer with high acidity by having two or more carboxyl groups in a single molecule thereof, the binding agent is considered to easily trap the lithium ions and the like before a degradation reaction of the electrolytic solution occurs during charging. Furthermore, although the polymer has an increased acidity because the polymer has more carboxyl groups per monomer when compared to polyacrylic acid and polymethacrylic acid, the acidity is not increased too much because a certain amount of carboxyl groups have changed into acid anhydride groups. Therefore, the secondary battery having the negative electrode using the polymer as the binding agent has improved initial efficiency and improved input-output characteristics.

The blending ratio of the binding agent in the negative electrode active material layer in mass ratio is preferably negative electrode active material:binding agent=1:0.005 to 1:0.3. The reason is that if too little of the binding agent is contained, moldability of the electrode deteriorates, whereas if too much of the binding agent is contained, energy density of the electrode becomes low.

The conductive additive is added for increasing conductivity of the electrode. Thus, the conductive additive is preferably added optionally when conductivity of the electrode is insufficient, and does not have to be added when conductivity of the electrode is sufficiently good. As the conductive additive, a fine electron conductor that is chemically inert may be used, and examples thereof include carbonaceous fine particles such as carbon black, graphite, vapor grown carbon fiber, and various metal particles. Examples of carbon black include acetylene black, Ketjen black (registered trademark), furnace black, and channel black. With regard to the conductive additive described above, a single type, or a combination of two or more types may be added to the active material layer. The blending ratio of the conductive additive in the negative electrode active material layer in mass ratio is preferably negative electrode active material:conductive additive=1:0.01 to 1:0.5. The reason is that when too little of the conductive additive is contained, efficient conducting paths are not formed, whereas when too much of the conductive additive is contained, moldability of the negative electrode active material layer deteriorates and energy density of the electrode becomes low.

The positive electrode used in the lithium ion secondary battery includes a positive electrode active material capable of occluding and releasing lithium ions. The positive electrode includes a current collector made from aluminum and a positive electrode active material layer bound to the surface of the current collector. The positive electrode active material layer includes a positive electrode active material, and, if necessary, a binding agent and/or a conductive additive.

The material of the current collector made from aluminum is aluminum or an aluminum alloy. Here, aluminum refers to pure aluminum, and an aluminum whose purity is not less than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, Al—Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector may be coated with a known protective layer. One obtained by treating the surface of the current collector with a known method may be used as the current collector.

The current collector takes forms such as a foil, a sheet, a film, a line shape, a bar shape, and a mesh. When the current collector is in the form of a foil, a sheet, or a film, the thickness thereof is preferably in a range of 1 μm to 100 μm.

As the binding agent and the conductive additive for the positive electrode, those described with respect to the negative electrode are used at similar blending ratios.

Examples of the positive electrode active material include layer compounds that are $Li_aNi_bCo_cMn_dD_eO_f$ (0.2≤a≤1.2; b+c+d+e=1; 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.7 f 2.1) and $Li_2MnO_3$. Additional examples of the positive electrode active material include metal oxides having a spinel structure such as $LiMn_2O_4$, a solid solution formed from a mixture of a metal oxide having a spinel structure and a layer compound, and polyanion based compounds represented by $LiMPO_4$, $LiMVO_4$, $Li_2MSiO_4$ (where "M" is selected from at least one of Co, Ni, Mn, or Fe), or the like. Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used. In addition, as the positive electrode active material, one that does not contain a charge carrier (e.g., a lithium ion contributing to the charging and discharging) may also be used. For example, elemental substance sulfur (S), a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate based materials such as conjugate diacetic acid based organic matters, and other known materials may be used. Furthermore, a compound having a stable radical such as nitroxide, nitronyl nitroxide, galvinoxyl, and phenoxyl may be used as the positive electrode active material. When a positive electrode active material not containing a charge carrier such as lithium is to be used, a charge carrier has to be added in advance to the positive electrode and/or the negative electrode using a known method. The charge carrier may be added in an ionic state, or may be added in a nonionic state such as a metal. For example, when the charge carrier is lithium, a lithium foil may be pasted to and integrated with the positive electrode and/or the negative electrode.

Specific examples of the positive electrode active material include $LiNi_{0.5}Co_{0.2}Mn_{0.3}O_2$, $LiNi_{1/3}Co_{1/3}Mn_{1/3}O_2$, $LiNi_{0.5}Mn_{0.5}O_2$, $LiNi_{0.75}Co_{0.1}Mn_{0.15}O_2$, $LiMnO_2$, $LiNiO_2$, and $LiCoO_2$ having a layered rock salt structure. Another specific example of the positive electrode active material is $Li_2MnO_3$—$LiCoO_2$.

Specific examples of the positive electrode active material include $Li_xA_yMn_{2-y}O_4$ having a spinel structure ("A" is at least one element selected from Ca, Mg, S, Si, Na, K, Al, P, Ga, or Ge, and/or at least one type of metal element selected from transition metal elements, $0 \leq x \leq 2.2$, $0 \leq y \leq 1$). More specific examples include $LiMn_2O_4$, and $LiNi_{0.5}Mn_{1.5}O_4$.

Specific examples of the positive electrode active material include $LiFePO_4$, $Li_2FeSiO_4$, $LiCoPO_4$, $Li_2CoPO_4$, $Li_2MnPO_4$, $Li_2MnSiO_4$, and $Li_2CoPO_4F$.

In order to form the active material layer on the surface of the current collector, the active material may be applied on the surface of the current collector using a known conventional method such as roll coating method, die coating method, dip coating method, doctor blade method, spray coating method, and curtain coating method. Specifically, an active material layer forming composition containing the active material and, if necessary, the binding agent and the conductive additive, is prepared, and, after adding a suitable solvent to this composition to obtain a paste, the paste is applied on the surface of the current collector and then dried. Examples of the solvent include N-methyl-2-pyrrolidone, methanol, methyl isobutyl ketone, and water. In order to increase electrode density, compression may be performed after drying.

A separator is used in the lithium ion secondary battery, if necessary. The separator is for separating the positive electrode and the negative electrode to allow passage of lithium ions while preventing short circuit due to a contact of both electrodes. As the separator, one that is known may be used. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

A specific method for producing the lithium ion secondary battery of the present invention is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution of the present invention to the electrode assembly. In addition, the lithium ion secondary battery of the present invention preferably executes charging and discharging in a voltage range suitable for the types of active materials contained in the electrodes.

In the lithium ion secondary battery of the present invention including the electrolytic solution of the present invention, a low-resistance SEI coating which has an S=O structure and is mainly composed of a component derived from the lithium salt represented by general formula (1) is formed at an electrode/electrolytic solution interface. Furthermore, in the lithium ion secondary battery of the present invention, the reaction resistance during charging and discharging is relatively low for the reasons such as a high Li ion concentration in the SEI coating.

The form of the lithium ion secondary battery of the present invention is not limited in particular, and various forms such as a cylindrical type, a square type, a coin type, a laminated type, etc., are used.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

A capacitor of the present invention including the electrolytic solution of the present invention may be formed by replacing, with active carbon or the like that is used as a polarized electrode material, a part or all of the negative electrode active material or the positive electrode active material, or a part or all of the negative electrode active material and the positive electrode active material, in the lithium ion secondary battery of the present invention described above. Examples of the capacitor of the present invention include electrical double layer capacitors and hybrid capacitors such as lithium ion capacitors. As the description of the capacitor of the present invention, the description of the lithium ion secondary battery of the present invention above in which "lithium ion secondary battery" is replaced by "capacitor" as appropriate is used.

Although embodiments of the electrolytic solution of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described specifically by presenting Examples, Comparative Examples, etc. The present invention is not limited to these Examples.

Production Example 1-1

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 9:1, whereby an electrolytic solution of Production Example 1-1 containing $(FSO_2)_2NLi$ at a concentration of 2.16 mol/L and containing $LiPF_6$ at a concentration of 0.24 mol/L was produced. In the electrolytic solution of Production Example 1-1, the concentration of the lithium salt is 2.4 mol/L, and the linear carbonate is contained at a mole ratio of 4 relative to the lithium salt. In addition, the ratio P of the moles of the alkali metal salt relative to the total moles of the first lithium salt and the alkali metal salt is 0.1.

Production Example 1-2

An electrolytic solution of Production Example 1-2 containing $(FSO_2)_2NLi$ at a concentration of 1.68 mol/L and containing $LiPF_6$ at a concentration of 0.72 mol/L was produced using a method similar to that in Production Example 1-1 except for decreasing the amount of $(FSO_2)_2NLi$ and increasing the amount of $LiPF_6$. In the electrolytic solution of Production Example 1-2, the concentration of the lithium salt is 2.4 mol/L, and the linear carbonate is contained at a mole ratio of 4 relative to the lithium salt. In addition, the ratio P of the moles of the alkali metal salt relative to the total moles of the first lithium salt and the alkali metal salt is 0.3.

Production Example 1-3

An electrolytic solution of Production Example 1-3 containing $(FSO_2)_2NLi$ at a concentration of 1.2 mol/L and containing $LiPF_6$ at a concentration of 1.2 mol/L was produced using a method similar to that in Production Example 1-1 except for decreasing the amount of $(FSO_2)_2NLi$ and increasing the amount of $LiPF_6$. In the electrolytic solution of Production Example 1-3, the concentration of the lithium salt is 2.4 mol/L, and the linear carbonate is contained at a mole ratio of 4 relative to the lithium salt. In addition, the ratio P of the moles of the alkali metal salt relative to the total moles of the first lithium salt and the alkali metal salt is 0.5.

Production Example 1-4

An electrolytic solution of Production Example 1-4 containing $(FSO_2)_2NLi$ at a concentration of 0.72 mol/L and containing $LiPF_6$ at a concentration of 1.68 mol/L was produced using a method similar to that in Production Example 1-1 except for decreasing the amount of $(FSO_2)_2NLi$ and increasing the amount of $LiPF_6$. In the electrolytic solution of Production Example 1-4, the concentration of the lithium salt is 2.4 mol/L, and the linear carbonate is contained at a mole ratio of 4 relative to the lithium salt. In addition, the ratio P of the moles of the alkali metal salt relative to the total moles of the first lithium salt and the alkali metal salt is 0.7.

Comparative Production Example 1-1

An electrolytic solution of Comparative Production Example 1-1 containing $(FSO_2)_2NLi$ at a concentration of 2.4 mol/L was produced using a method similar to that in Production Example 1-1 except for increasing the amount of $(FSO_2)_2NLi$ and not using $LiPF_6$. In the electrolytic solution of Comparative Production Example 1-1, the linear carbonate is contained at a mole ratio of 4 relative to the lithium salt.

Comparative Production Example 1-2

An electrolytic solution of Comparative Production Example 1-2 containing $LiPF_6$ at a concentration of 2.4 mol/L was produced using a method similar to that in Production Example 1-1 except for not using $(FSO_2)_2NLi$ and increasing the amount of $LiPF_6$. In the electrolytic solution of Comparative Production Example 1-2, the linear carbonate is contained at a mole ratio of 4 relative to the lithium salt.

Table 1 shows the list of the electrolytic solutions of Production Example 1-1 to 1-4 and Comparative Production Examples 1-1 and 1-2.

TABLE 1

| Electrolytic solution | LiFSA concentration (mol/L) | $LiPF_6$ concentration (mol/L) | P |
|---|---|---|---|
| Production Example 1-1 | 2.16 | 0.24 | 0.1 |
| Production Example 1-2 | 1.68 | 0.72 | 0.3 |

TABLE 1-continued

| Electrolytic solution | LiFSA concentration (mol/L) | LiPF$_6$ concentration (mol/L) | P |
|---|---|---|---|
| Production Example 1-3 | 1.2 | 1.2 | 0.5 |
| Production Example 1-4 | 0.72 | 1.68 | 0.7 |
| Comparative Production Example 1-1 | 2.4 | 0 | 0 |
| Comparative Production Example 1-2 | 0 | 2.4 | 1 |

Each of the organic solvents in the electrolytic solutions in Table 1 is a mixed solvent obtained by mixing dimethyl carbonate and ethyl methyl carbonate each serving as the linear carbonate at a mole ratio of 9:1.

The meanings of abbreviations in Table 1 and tables below are as follows.

LiFSA: $(FSO_2)_2NLi$

DMC: dimethyl carbonate

EMC: ethyl methyl carbonate

Example 1-1

A lithium ion secondary battery of Example 1-1 was produced in the following manner using the electrolytic solution of Production Example 1-1.

90 parts by mass of a lithium-containing metal oxide having a layered rock salt structure represented by $LiNi_{5/10}Co_{2/10}Mn_{3/10}O_2$ and serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 15 μm was prepared. The slurry was applied in a film form on both surfaces of the aluminum foil. The aluminum foil on which the slurry was applied was dried in a furnace at 120° C. to remove N-methyl-2-pyrrolidone by volatilization. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode.

98 parts by mass of a graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion-exchanged water to create a slurry. As the negative electrode current collector, a copper foil having a thickness of 10 μm was prepared. The slurry was applied in a film form on both surfaces of the copper foil. The copper foil on which the slurry was applied was dried to remove water. Then, the copper foil was pressed to obtain a joined object. The obtained joined object was heated and dried in a vacuum dryer for 6 hours at 100° C. to obtain a copper foil having a negative electrode active material layer formed thereon. This was used as the negative electrode.

As the separator, a microporous film made from polyolefin and having a thickness of 20 μm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Production Example 1-1 was poured into the laminate film. Four sides were sealed airtight by sealing the remaining one side to obtain a lithium ion secondary battery in which the electrode assembly and the electrolytic solution were sealed. This battery was used as the lithium ion secondary battery of Example 1-1.

Example 1-2

A lithium ion secondary battery of Example 1-2 was produced using a method similar to that in Example 1-1 except for using the electrolytic solution of Production Example 1-2.

Example 1-3

A lithium ion secondary battery of Example 1-3 was produced using a method similar to that in Example 1-1 except for using the electrolytic solution of Production Example 1-3.

Example 1-4

A lithium ion secondary battery of Example 1-4 was produced using a method similar to that in Example 1-1 except for using the electrolytic solution of Production Example 1-4.

Comparative Example 1-1

A lithium ion secondary battery of Comparative Example 1-1 was produced using a method similar to that in Example 1-1 except for using the electrolytic solution of Comparative Production Example 1-1.

Comparative Example 1-2

A lithium ion secondary battery of Comparative Example 1-2 was produced using a method similar to that in Example 1-1 except for using the electrolytic solution of Comparative Production Example 1-2.

Evaluation Example 1-1

With respect to each lithium ion secondary battery, a voltage of approximately 5.5 V was applied and a capacity corresponding to twice a capacity in a voltage range of 3 V to 4.1 V was charged, that is, overcharging was performed. The charged lithium ion secondary battery was disassembled, and the negative electrode was taken out. The amount of aluminum adhering to the negative electrode was measured by using inductively-coupled plasma emission spectrometry. The measurement result of each lithium ion secondary battery defined with the measurement result of the lithium ion secondary battery of Comparative Example 1-1 being set as 100, is shown in Table 2 together with information about the electrolyte in each electrolytic solution.

TABLE 2

| | LiFSA concentration (mol/L) | LiPF$_6$ concentration (mol/L) | P | Al amount |
|---|---|---|---|---|
| Example 1-1 | 2.16 | 0.24 | 0.1 | 72.4 |
| Example 1-2 | 1.68 | 0.72 | 0.3 | 24.5 |
| Example 1-3 | 1.2 | 1.2 | 0.5 | 0.3 |
| Example 1-4 | 0.72 | 1.68 | 0.7 | 0.2 |
| Comparative Example 1-1 | 2.4 | 0 | 0 | 100 |
| Comparative Example 1-2 | 0 | 2.4 | 1 | 0 |

Aluminum measured in Evaluation Example 1-1 is the amount of aluminum that was eluted from the current collector made from aluminum in the positive electrode of each lithium ion secondary battery and adhered to the negative electrode. From the results in Table 2, elution of aluminum from the current collector of the positive electrode in the overcharge range is understood to be suppressed because of the existence of LiPF$_6$ in the electrolytic solution.

Evaluation Example 1-2

With respect to each lithium ion secondary battery, charging was performed up to a voltage of 4.1 V under conditions of room temperature and 1C, and this voltage was kept for 3 hours. Then, discharging was performed down to a voltage of 3 V under conditions of room temperature and 1C, and a discharge capacity was measured when this voltage was kept for 3 hours. This discharge capacity was regarded as an initial capacity. With respect to each lithium ion secondary battery, charging and discharging between voltages of 3 V and 4.1 V under conditions of 60° C. and 1C was repeated for 30 cycles. After charging and discharging of 30 cycles, with respect to each lithium ion secondary battery, a discharge capacity was measured under the same conditions as those for the initial capacity measurement. This discharge capacity was regarded as a capacity after the cycles. 1C means a current value required for fully charging or discharging the secondary battery in 1 hour with a constant current. The capacity retention rate was calculated by the following equation. The results are shown in Table 3.

Capacity retention rate (%)=100×(capacity after cycles)/(initial capacity)

TABLE 3

| | LiFSA concentration (mol/L) | LiPF$_6$ concentration (mol/L) | P | Capacity retention rate (%) |
|---|---|---|---|---|
| Example 1-1 | 2.16 | 0.24 | 0.1 | 98.7 |
| Example 1-2 | 1.68 | 0.72 | 0.3 | 95.9 |
| Example 1-3 | 1.2 | 1.2 | 0.5 | 87.4 |
| Example 1-4 | 0.72 | 1.68 | 0.7 | 88.6 |
| Comparative Example 1-1 | 2.4 | 0 | 0 | 100 |
| Comparative Example 1-2 | 0 | 2.4 | 1 | 47 |

From the results in Table 3, the capacity of the lithium ion secondary battery is understood to be suitably maintained with the electrolytic solution containing (FSO$_2$)$_2$NLi. In addition, the capacity of the lithium ion secondary battery is understood to be more suitably maintained with the electrolytic solution containing a small amount of LiPF$_6$.

In view of both of the results in Tables 2 and 3, the lithium ion secondary battery including the electrolytic solution in which 0<P≤0.7 is satisfied is considered to suitably maintain the capacity thereof while suppressing elution of aluminum from the positive electrode current collector in the overcharge range. Furthermore, the lithium ion secondary battery including the electrolytic solution in which 0<P≤0.3 is satisfied is considered to more suitably maintain the capacity thereof.

Production Example 2-1

(FSO$_2$)$_2$NLi serving as the first lithium salt and LiPF$_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 65.8:28.2:6.0, whereby an electrolytic solution of Production Example 2-1 containing (FSO$_2$)$_2$NLi at a concentration of 1.52 mol/L and containing LiPF$_6$ at a concentration of 0.20 mol/L was produced. In the electrolytic solution of Production Example 2-1, the concentration of the lithium salt is 1.72 mol/L, the mixed solvent is contained at a mole ratio of 5.5 relative to the lithium salt, and the linear carbonate is contained at a mole ratio of 5.17 relative to the lithium salt. In addition, the ratio P of the moles of the alkali metal salt relative to the total moles of the first lithium salt and the alkali metal salt is 0.116.

Production Example 2-2

(FSO$_2$)$_2$NLi serving as the first lithium salt and LiPF$_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 67.9:29.1:3.0, whereby an electrolytic solution of Production Example 2-2 containing (FSO$_2$)$_2$NLi at a concentration of 1.71 mol/L and containing LiPF$_6$ at a concentration of 0.10 mol/L was produced. In the electrolytic solution of Production Example 2-2, the concentration of the lithium salt is 1.81 mol/L, the mixed solvent is contained at a mole ratio of 5.2 relative to the lithium salt, and the linear carbonate is contained at a mole ratio of 5.04 relative to the lithium salt. In addition, the ratio P of the moles of the alkali metal salt relative to the total moles of the first lithium salt and the alkali metal salt is 0.055.

Production Example 2-3

(FSO$_2$)$_2$NLi serving as the first lithium salt and LiPF$_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 69.0:29.5:1.5, whereby an electrolytic solution of Production Example 2-3 containing (FSO$_2$)$_2$NLi at a concentration of 1.81 mol/L and containing LiPF$_6$ at a concentration of 0.05 mol/L was produced. In the electrolytic solution of Production Example 2-3, the concentration of the lithium salt is 1.86 mol/L, the mixed solvent is contained at a mole ratio of 5.1 relative to the lithium salt, and the linear carbonate is contained at a mole ratio of 5.02 relative to the lithium salt. In addition, the ratio P of the moles of the alkali metal salt relative to the total moles of the first lithium salt and the alkali metal salt is 0.027.

Production Example 2-4

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 2-4 containing $(FSO_2)_2NLi$ at a concentration of 1.55 mol/L and containing $LiPF_6$ at a concentration of 0.20 mol/L was produced. In the electrolytic solution of Production Example 2-4, the concentration of the lithium salt is 1.75 mol/L, and the linear carbonate is contained at a mole ratio of 5.5 relative to the lithium salt. In addition, the ratio P of the moles of the alkali metal salt relative to the total moles of the first lithium salt and the alkali metal salt is 0.114.

Comparative Production Example 2-1

$(FSO_2)_2NLi$ was dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 65.8:28.2:6.0, whereby an electrolytic solution of Comparative Production Example 2-1 containing $(FSO_2)_2NLi$ at a concentration of 1.76 mol/L was produced. In the electrolytic solution of Comparative Production Example 2-1, the mixed solvent is contained at a mole ratio of 5.5 relative to the lithium salt, and the linear carbonate is contained at a mole ratio of 5.17 relative to the lithium salt.

Comparative Production Example 2-2

$(FSO_2)_2NLi$ was dissolved in a mixed solvent obtained by mixing dimethyl carbonate and ethyl methyl carbonate each serving as the linear carbonate at a mole ratio of 7:3, whereby an electrolytic solution of Comparative Production Example 2-2 containing $(FSO_2)_2NLi$ at a concentration of 2 mol/L was produced. In the electrolytic solution of Comparative Production Example 2-2, the linear carbonate is contained at a mole ratio of 5.0 relative to the lithium salt.

Table 4 shows the list of the electrolytic solutions of Production Examples 2-1 to 2-4 and Comparative Production Examples 2-1 and 2-2.

TABLE 4

| Electrolytic solution | LiFSA concentration (mol/L) | LiPF$_6$ concentration (mol/L) | P | Ratio of FEC relative to entire organic solvent |
|---|---|---|---|---|
| Production Example 2-1 | 1.52 | 0.20 | 0.116 | 6 |
| Production Example 2-2 | 1.71 | 0.10 | 0.055 | 3 |
| Production Example 2-3 | 1.81 | 0.05 | 0.027 | 1.5 |
| Production Example 2-4 | 1.55 | 0.20 | 0.114 | 0 |
| Comparative Production Example 2-1 | 1.76 | 0 | 0 | 6 |
| Comparative Production Example 2-2 | 2 | 0 | 0 | 0 |

In each of the electrolytic solutions in Table 4, the mole ratio of dimethyl carbonate to ethyl methyl carbonate is 7:3. FEC in Table 4 is an abbreviation for fluoroethylene carbonate.

Example 2-1

A half-cell using the electrolytic solution of Production Example 2-1 was produced in the following manner.

An aluminum foil (JIS A1000 series) having a diameter of 13.82 mm, an area of 1.5 cm$^2$, and a thickness of 15 μm was used as the working electrode, and metal Li was used as the counter electrode. As the separator, a Whatman glass filter nonwoven fabric was used. The working electrode, the counter electrode, the separator, and the electrolytic solution of Production Example 2-1 were put into a battery case (Hohsen Corp., CR2032 type coin cell case) to form a half-cell. This was used as a coin cell of Example 2-1.

Example 2-2

A coin cell of Example 2-2 was produced in a manner similar to that for the coin cell of Example 2-1 except for using the electrolytic solution of Production Example 2-2.

Example 2-3

A coin cell of Example 2-3 was produced in a manner similar to that for the coin cell of Example 2-1 except for using the electrolytic solution of Production Example 2-3.

Example 2-4

A coin cell of Example 2-4 was produced in a manner similar to that for the coin cell of Example 2-1 except for using the electrolytic solution of Production Example 2-4.

Comparative Example 2-1

A coin cell of Comparative Example 2-1 was produced in a manner similar to that for the coin cell of Example 2-1 except for using the electrolytic solution of Comparative Production Example 2-1.

Comparative Example 2-2

A coin cell of Comparative Example 2-2 was produced in a manner similar to that for the coin cell of Example 2-1 except for using the electrolytic solution of Comparative Production Example 2-2.

Evaluation Example 2

Figure 2:
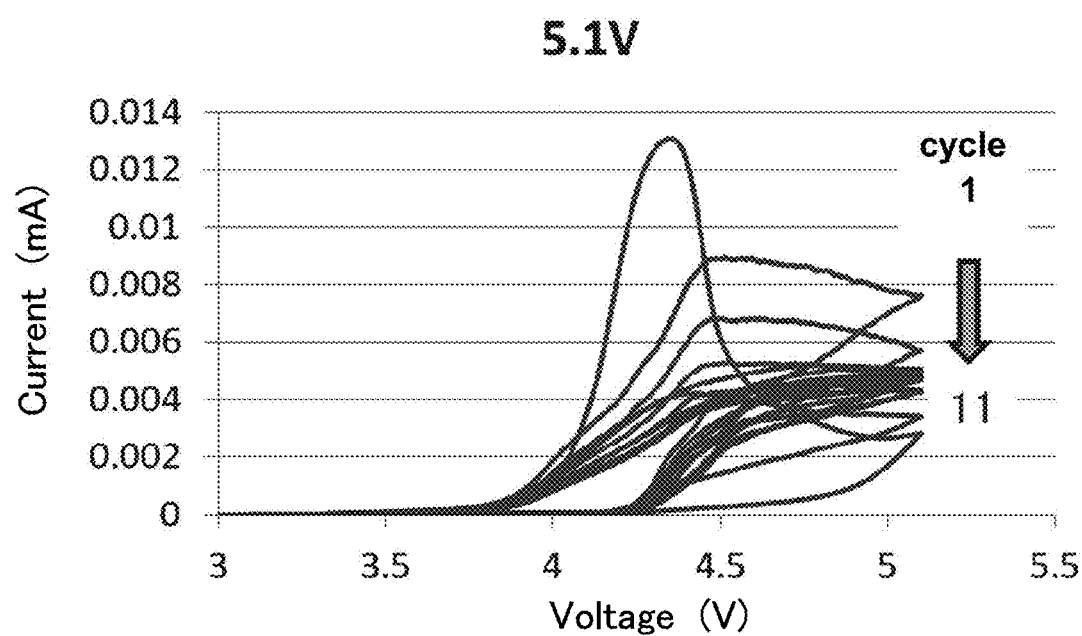
FIG. 2 is a graph showing the relationship between potential (3.1 to 5.1 V) and response current in the coin cell of Example 2-1.
Figure 3:
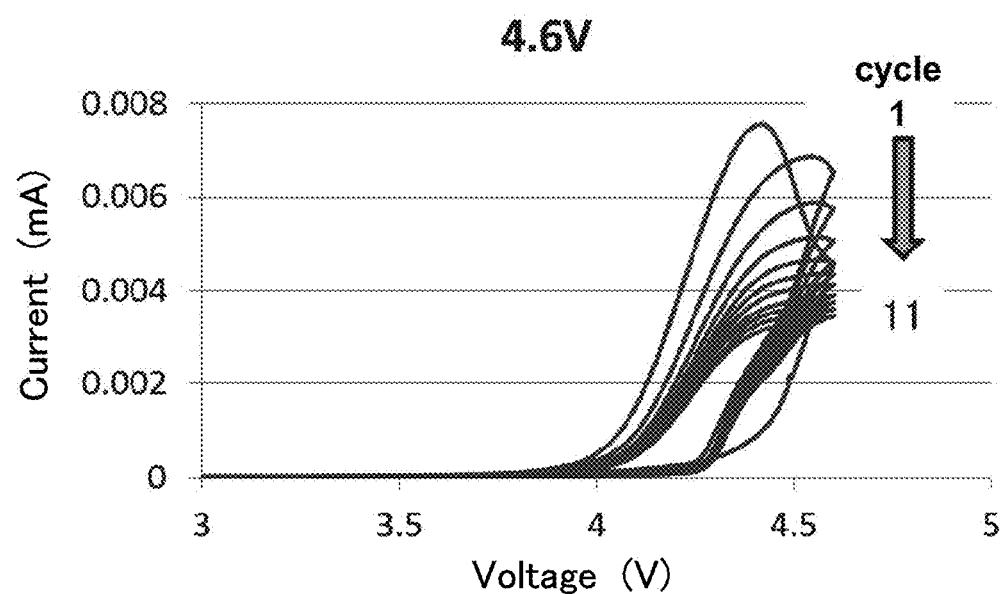
FIG. 3 is a graph showing the relationship between potential (3.1 to 4.6 V) and response current in a coin cell of Example 2-2.
Figure 4:
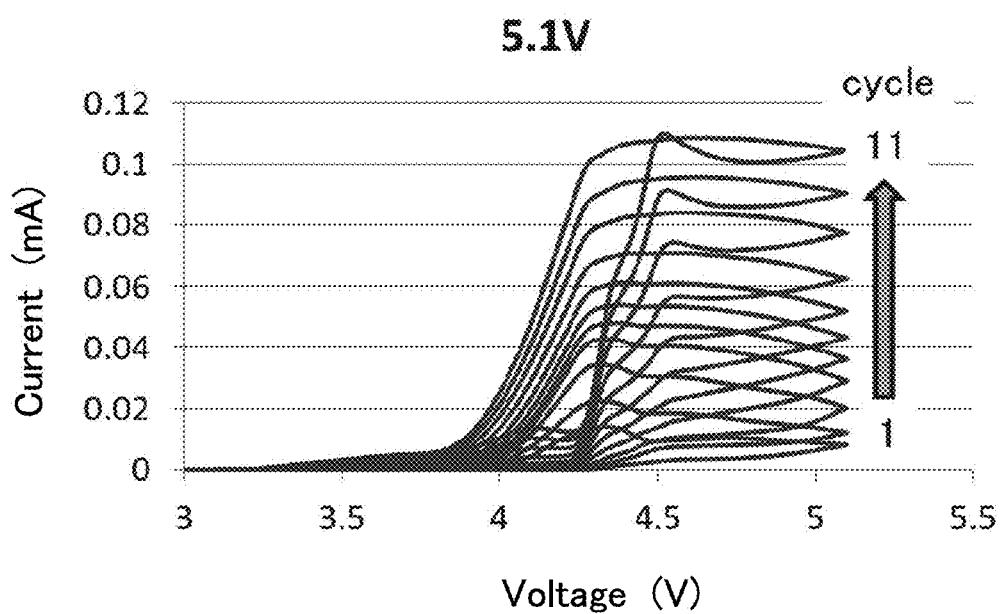
FIG. 4 is a graph showing the relationship between potential (3.1 to 5.1 V) and response current in the coin cell of Example 2-2.
Figure 5:
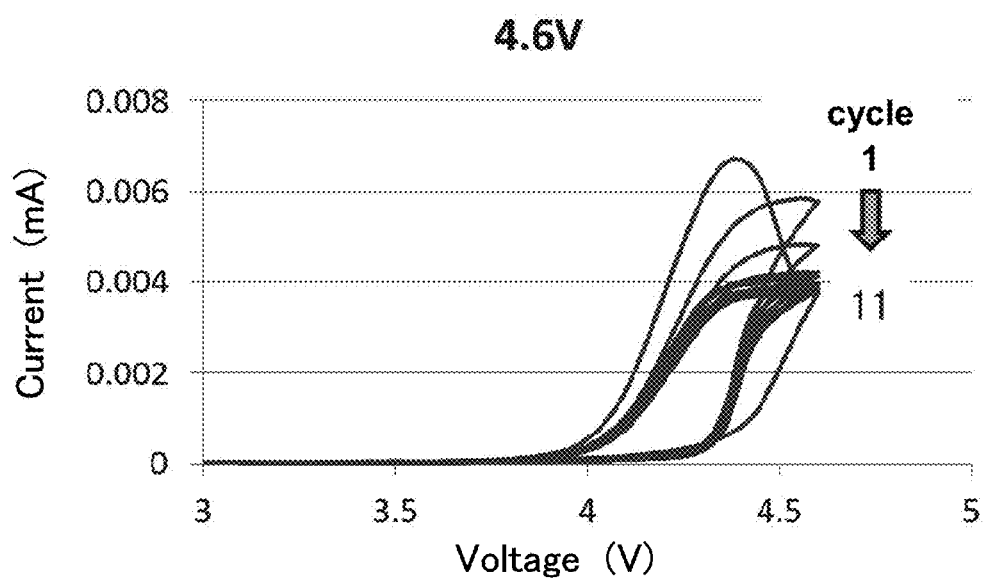
FIG. 5 is a graph showing the relationship between potential (3.1 to 4.6 V) and response current in a coin cell of Example 2-3.
Figure 6:
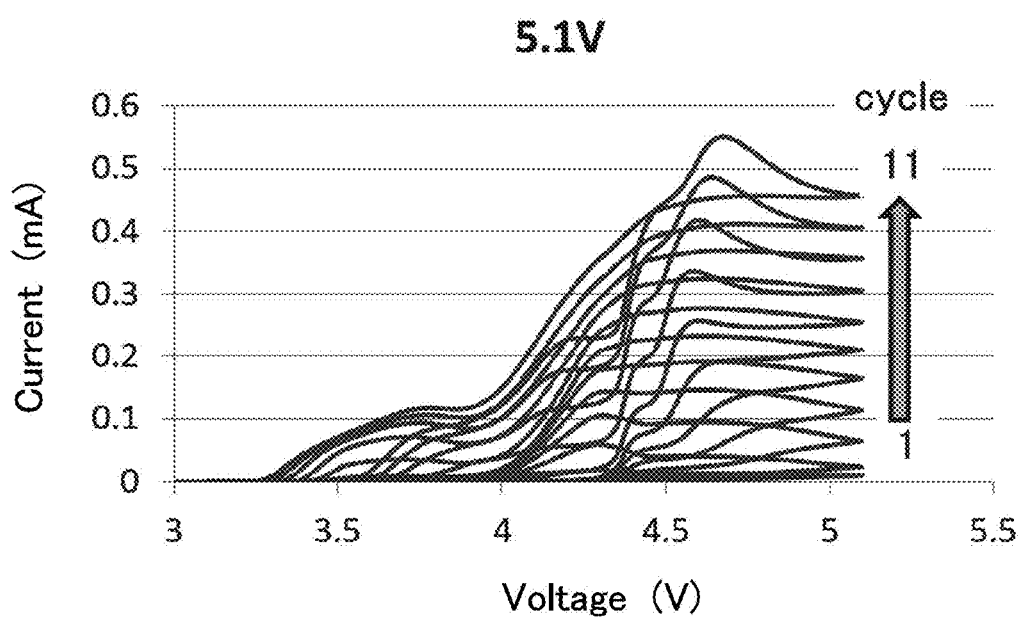
FIG. 6 is a graph showing the relationship between potential (3.1 to 5.1 V) and response current in the coin cell of Example 2-3.
Figure 7:
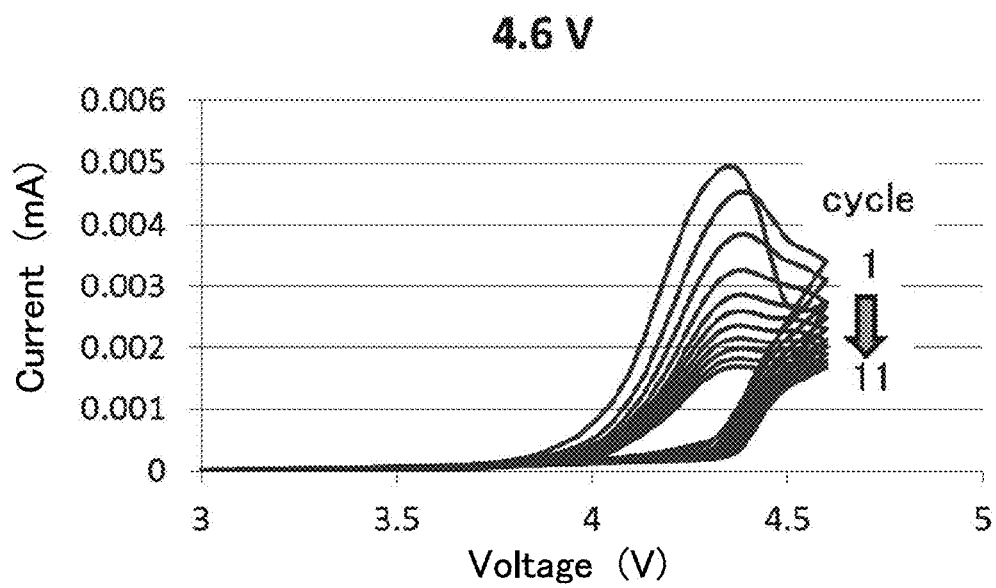
FIG. 7 is a graph showing the relationship between potential (3.1 to 4.6 V) and response current in a coin cell of Example 2-4.
Figure 8:
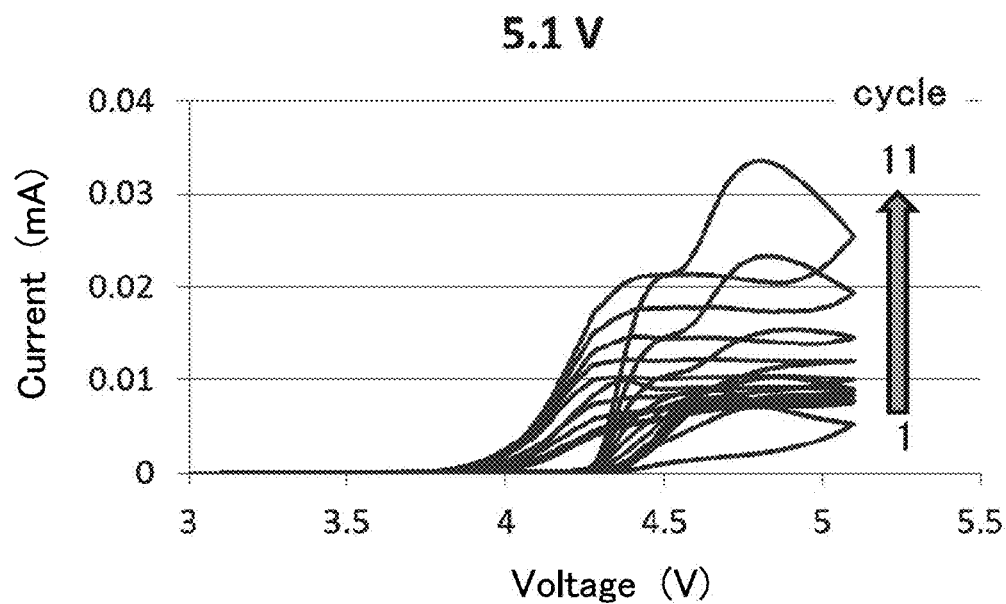
FIG. 8 is a graph showing the relationship between potential (3.1 to 5.1 V) and response current in the coin cell of Example 2-4.
Figure 9:
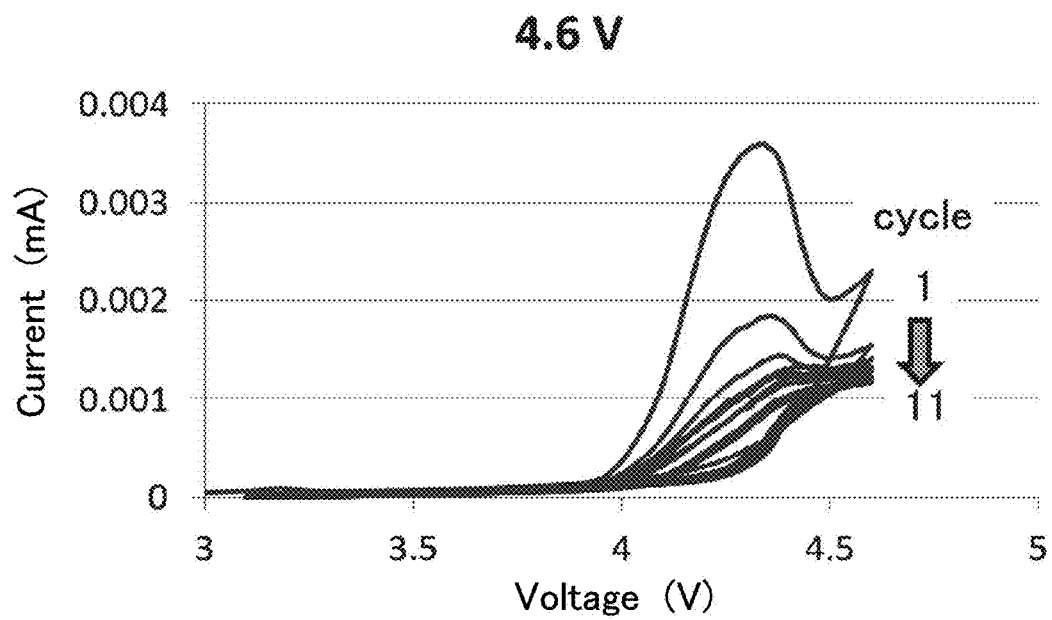
FIG. 9 is a graph showing the relationship between potential (3.1 to 4.6 V) and response current in a coin cell of Comparative Example 2-1.
Figure 10:
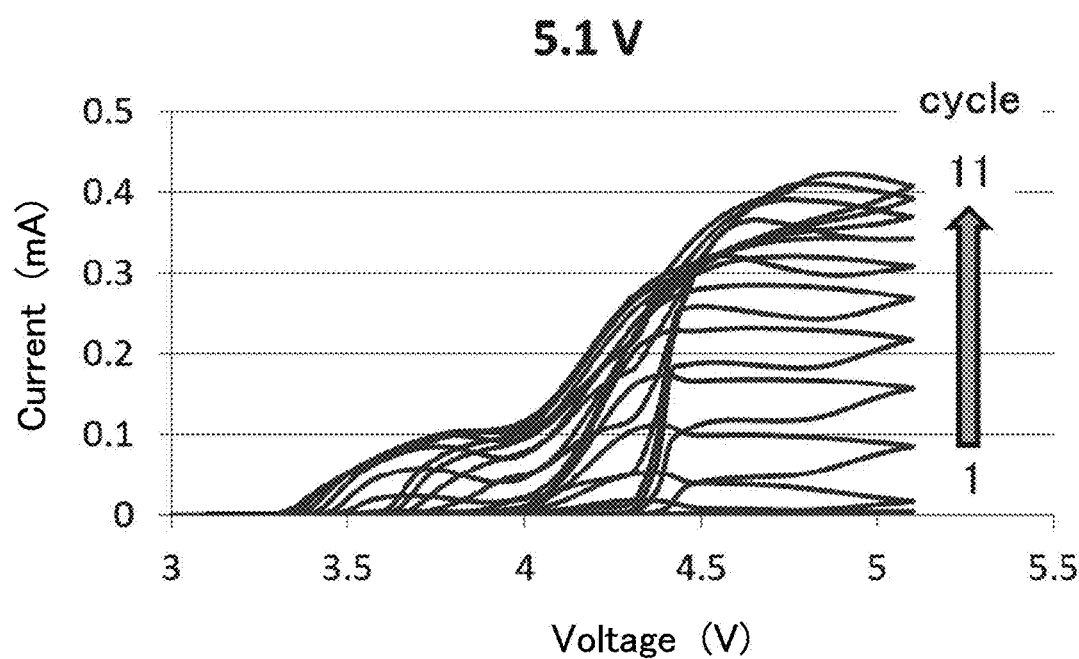
FIG. 10 is a graph showing the relationship between potential (3.1 to 5.1 V) and response current in the coin cell of Comparative Example 2-1.
Figure 11:
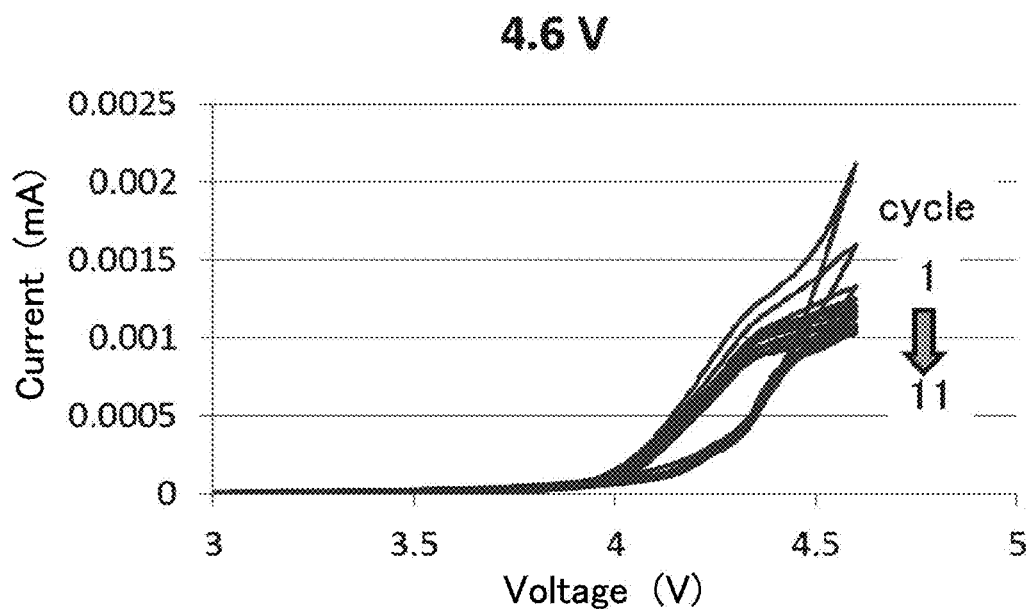
FIG. 11 is a graph showing the relationship between potential (3.1 to 4.6V) and response current in a coin cell of Comparative Example 2-2.
Figure 12:
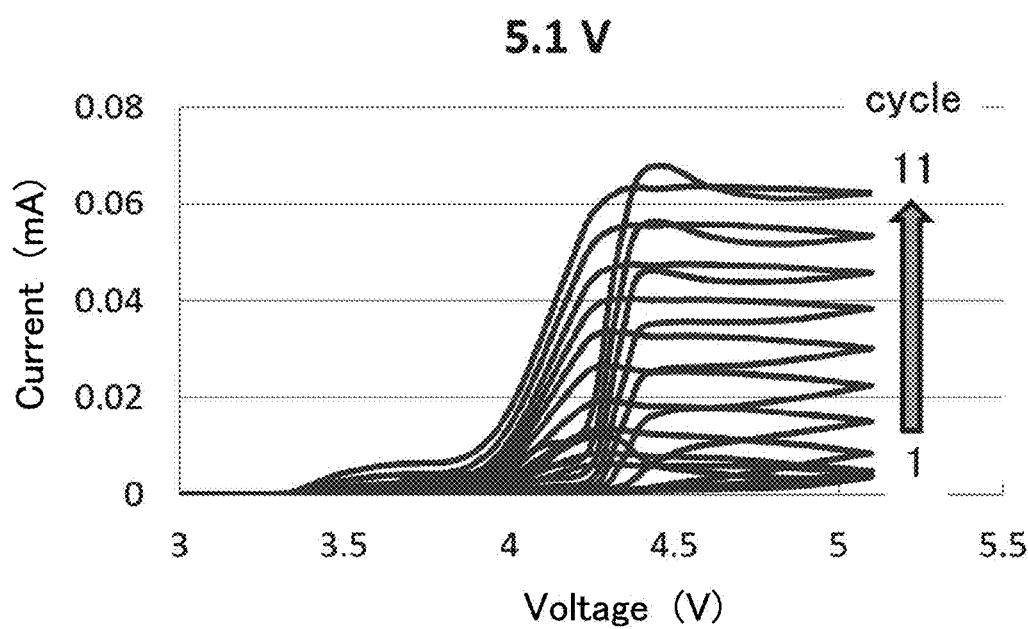
FIG. 12 is a graph showing the relationship between potential (3.1 to 5.1 V) and response current in the coin cell of Comparative Example 2-2.

With respect to each coin cell, 11 cycles of cyclic voltammetry evaluation were performed under conditions of 20° C., 3.1 V to 4.6 V, and 1 mV/s, and then 11 cycles of cyclic voltammetry evaluation were performed under conditions of 20° C., 3.1 V to 5.1 V, and 1 mV/s. FIGS. 1 to 12 show graphs showing the relationships between potential and response current in the coin cells of the Examples and the Comparative Examples. The arrows in the drawings each show the transition of the magnitude of the response current per cycle. More aluminum is considered to be eluted when the value of the response current becomes higher.

From the results in FIGS. 1 to 6 and FIGS. 11 and 12 corresponding to Examples 2-1 to 2-3 and Comparative Example 2-2, with the electrolytic solution containing a larger amount of $LiPF_6$ and fluoroethylene carbonate, the value of the response current is lower, and thus elution of aluminum is considered to be suitably suppressed. In particular, under any of the conditions for cyclic voltammetry evaluation, the response current of the coin cell of Example 2-1 decreased as the cycle progressed, which is particularly noteworthy.

From the results in FIGS. 1, 2, 7, and 8 corresponding to Examples 2-1 and 2-4, elution of aluminum is considered to be more suitably suppressed when $LiPF_6$ and fluoroethylene carbonate exist together in the electrolytic solution. Furthermore, from the results in FIGS. 9 to 12 corresponding to Comparative Examples 2-1 and 2-2, elution of aluminum is considered to be promoted rather than being suppressed, when fluoroethylene carbonate is added to the electrolytic solution not containing $LiPF_6$. From the above results, the suitable aluminum elution suppression effect exhibited in the lithium ion secondary battery of the present invention in which $LiPF_6$ and fluoroethylene carbonate exist together is considered to be due to interaction between $LiPF_6$ serving as a specific alkali metal salt and fluoroethylene carbonate serving as the fluorine-containing cyclic carbonate.

Production Example 3-1

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 3-1 containing $(FSO_2)_2NLi$ at a concentration of 1.38 mol/L and containing $LiPF_6$ at a concentration of 1.38 mol/L was produced. In the electrolytic solution of Production Example 3-1, the concentration of the lithium salt is 2.76 mol/L, and the linear carbonate is contained at a mole ratio of 3 relative to the lithium salt. In addition, the ratio P of the moles of the alkali metal salt relative to the total moles of the first lithium salt and the alkali metal salt is 0.5.

Production Example 3-2

An electrolytic solution of Production Example 3-2 containing $(FSO_2)_2NLi$ at a concentration of 1.09 mol/L and containing $LiPF_6$ at a concentration of 1.09 mol/L was produced using a method similar to that in Production Example 3-1 except for decreasing the dissolved amounts of $(FSO_2)_2NLi$ and $LiPF_6$. In the electrolytic solution of Production Example 3-2, the concentration of the lithium salt is 2.18 mol/L, and the linear carbonate is contained at a mole ratio of 4 relative to the lithium salt. In addition, the ratio P of the moles of the alkali metal salt relative to the total moles of the first lithium salt and the alkali metal salt is 0.5.

Production Example 3-3

An electrolytic solution of Production Example 3-3 containing $(FSO_2)_2NLi$ at a concentration of 0.90 mol/L and containing $LiPF_6$ at a concentration of 0.90 mol/L was produced using a method similar to that in Production Example 3-1 except for decreasing the dissolved amounts of $(FSO_2)_2NLi$ and $LiPF_6$. In the electrolytic solution of Production Example 3-3, the concentration of the lithium salt is 1.80 mol/L, and the linear carbonate is contained at a mole ratio of 5 relative to the lithium salt. In addition, the ratio P of the moles of the alkali metal salt relative to the total moles of the first lithium salt and the alkali metal salt is 0.5.

Production Example 3-4

An electrolytic solution of Production Example 3-4 containing $(FSO_2)_2NLi$ at a concentration of 0.77 mol/L and containing $LiPF_6$ at a concentration of 0.77 mol/L was produced using a method similar to that in Production Example 3-1 except for decreasing the dissolved amounts of $(FSO_2)_2NLi$ and $LiPF_6$. In the electrolytic solution of Production Example 3-4, the concentration of the lithium salt is 1.54 mol/L, and the linear carbonate is contained at a mole ratio of 6 relative to the lithium salt. In addition, the ratio P of the moles of the alkali metal salt relative to the total moles of the first lithium salt and the alkali metal salt is 0.5.

Comparative Production Example 3-1

An electrolytic solution of Comparative Production Example 3-1 containing $(FSO_2)_2NLi$ at a concentration of 0.48 mol/L and containing $LiPF_6$ at a concentration of 0.48 mol/L was produced using a method similar to that in Production Example 3-1 except for decreasing the dissolved amounts of $(FSO_2)_2NLi$ and $LiPF_6$. In the electrolytic solution of Comparative Production Example 3-1, the concentration of the lithium salt is 0.96 mol/L, and the linear carbonate is contained at a mole ratio of 10 relative to the lithium salt. In addition, the ratio P of the moles of the alkali metal salt relative to the total moles of the first lithium salt and the alkali metal salt is 0.5.

Comparative Production Example 3-2

$(FSO_2)_2NLi$ was dissolved in a mixed solvent obtained by mixing dimethyl carbonate and ethyl methyl carbonate each serving as the linear carbonate at a mole ratio of 7:3, whereby an electrolytic solution of Comparative Production Example 3-2 containing $(FSO_2)_2NLi$ at a concentration of 2 mol/L was produced. In the electrolytic solution of Comparative Production Example 3-2, the linear carbonate is contained at a mole ratio of 5 relative to the lithium salt.

Table 5 shows the list of the electrolytic solutions of Production Examples 3-1 to 3-4 and Comparative Production Examples 3-1 and 3-2.

TABLE 5

| Electrolytic solution | LiFSA (mol/L) | $LiPF_6$ (mol/L) | Lithium salt (mol/L) | Mole ratio | P |
|---|---|---|---|---|---|
| Production Example 3-1 | 1.38 | 1.38 | 2.76 | 3 | 0.5 |
| Production Example 3-2 | 1.09 | 1.09 | 2.18 | 4 | 0.5 |
| Production Example 3-3 | 0.90 | 0.90 | 1.80 | 5 | 0.5 |
| Production Example 3-4 | 0.77 | 0.77 | 1.54 | 6 | 0.5 |
| Comparative Production Example 3-1 | 0.48 | 0.48 | 0.96 | 10 | 0.5 |
| Comparative Production Example 3-2 | 2 | 0 | 2 | 5 | 0 |

The mole ratio in Table 5 is the mole ratio of the linear carbonate relative to the lithium salt. In each of the electrolytic solutions in Table 5, the mole ratio of dimethyl carbonate to ethyl methyl carbonate is 7:3.

Example 3-1

A lithium ion secondary battery of Example 3-1 was produced using a method similar to that for the lithium ion secondary battery of Example 1-1 except for using the electrolytic solution of Production Example 3-1.

Example 3-2

A lithium ion secondary battery of Example 3-2 was produced using a method similar to that in Example 3-1 except for using the electrolytic solution of Production Example 3-2.

Example 3-3

A lithium ion secondary battery of Example 3-3 was produced using a method similar to that in Example 3-1 except for using the electrolytic solution of Production Example 3-3.

Example 3-4

A lithium ion secondary battery of Example 3-4 was produced using a method similar to that in Example 3-1 except for using the electrolytic solution of Production Example 3-4.

Comparative Example 3-1

A lithium ion secondary battery of Comparative Example 3-1 was produced using a method similar to that in Example 3-1 except for using the electrolytic solution of Comparative Production Example 3-1.

Comparative Example 3-2

A lithium ion secondary battery of Comparative Example 3-2 was produced using a method similar to that in Example 3-1 except for using the electrolytic solution of Comparative Production Example 3-2.

Evaluation Example 3-1

With respect to each lithium ion secondary battery, a current of approximately 100 mAh was applied and a capacity corresponding to twice a capacity in a voltage range of 3 V to 4.1 V was charged, that is, overcharging was performed. The charged lithium ion secondary battery was disassembled, and the negative electrode was taken out. The amount of aluminum adhering to the negative electrode was measured by using inductively-coupled plasma emission spectrometry. The measurement result of each lithium ion secondary battery defined with the measurement result of the lithium ion secondary battery of Comparative Example 3-2 being set as 100, is shown in Table 6 together with information about the electrolytic solutions.

TABLE 6

| | Lithium salt (mol/L) | Mole ratio | P | Al amount |
|---|---|---|---|---|
| Example 3-1 | 2.76 | 3 | 0.5 | 0.61 |
| Example 3-2 | 2.18 | 4 | 0.5 | 0.71 |
| Example 3-3 | 1.80 | 5 | 0.5 | 0.92 |
| Example 3-4 | 1.54 | 6 | 0.5 | 2.57 |
| Comparative Example 3-1 | 0.96 | 10 | 0.5 | 18.23 |
| Comparative Example 3-2 | 2 | 5 | 0 | 100 |

Aluminum measured in Evaluation Example 3-1 is the amount of aluminum that was eluted from the current collector made from aluminum in the positive electrode of each lithium ion secondary battery and adhered to the negative electrode. From the results in Table 6, elution of aluminum from the current collector of the positive electrode in the overcharge range is understood to be suitably suppressed when the mole ratio of the linear carbonate relative to the lithium salt is in a range of 3 to 6. Furthermore, elution of aluminum is considered to be more suitably suppressed when the mole ratio of the linear carbonate relative to the lithium salt becomes lower. Moreover, elution of aluminum is considered to be more suitably suppressed when the concentration of the lithium salt becomes higher.

Evaluation Example 3-2

The lithium ion secondary battery of Example 3-1 adjusted to a voltage of 3.49 V was discharged at 15C rate at 25° C. for 2 seconds. A resistance value was calculated according to Ohm's law from the current value and the amount of change in voltage before and after this discharging. This resistance value was regarded as an initial resistance value With respect to the lithium ion secondary battery of Example 3-1, a durability test of repeating, for 30 times, a charging and discharging cycle of: charging from a voltage of 3.3 V to a voltage of 4.1 V at 2C rate at 60° C. and then discharging to a voltage of 3.3 V at 2C rate, was performed. The lithium ion secondary battery of Example 3-1 subjected to the durability test was adjusted to a voltage of 3.49 V and discharged at 15C rate at 25° C. for 2 seconds. A resistance value was calculated according to Ohm's law from the current value and the amount of change in voltage before and after this discharging. This resistance value was regarded as a resistance value after the durability test.

The same test was also performed with respect to the lithium ion secondary batteries of Examples 3-2 to 3-4 and Comparative Example 3-1. The rate of resistance change of each lithium ion secondary battery before and after the durability test was calculated by the following equation. The results are shown in Table 7.

Rate of resistance change=100×((resistance value after durability test)−(initial resistance value))/ (initial resistance value)

TABLE 7

| | Lithium salt (mol/L) | Mole ratio | P | Rate of resistance change |
|---|---|---|---|---|
| Example 3-1 | 2.76 | 3 | 0.5 | 1.5 |
| Example 3-2 | 2.18 | 4 | 0.5 | −1.9 |
| Example 3-3 | 1.80 | 5 | 0.5 | −2.9 |

TABLE 7-continued

| | Lithium salt (mol/L) | Mole ratio | P | Rate of resistance change |
|---|---|---|---|---|
| Example 3-4 | 1.54 | 6 | 0.5 | 6.7 |
| Comparative Example 3-1 | 0.96 | 10 | 0.5 | 9.9 |

From Table 7, the lithium ion secondary batteries of Examples 3-1 to 3-4 are confirmed to have a lower rate of resistance change before and after the durability test than the lithium ion secondary battery of Comparative Example 3-1. The lithium ion secondary batteries of Examples 3-1 to 3-3 have a significantly lower rate of resistance change before and after durability test, which is particularly noteworthy. Furthermore, the resistances of the lithium ion secondary batteries of Examples 3-2 and 3-3 decreased after the durability test, which is particularly noteworthy. The lithium ion secondary battery including the electrolytic solution in which the first lithium salt and the alkali metal salt are used in combination and in which the mole ratio of the linear carbonate relative to the lithium salt is in a range of 3 to 6, or further, in a range of 3 to 5, is considered to exhibit an excellent effect in terms of resistance change. In particular, the lithium ion secondary battery including the electrolytic solution in which the mole ratio of the linear carbonate relative to the lithium salt is in a range of 4 to 5 is considered to exhibit a significantly excellent effect in terms of resistance change. Regarding the lithium salt concentration, the lithium ion secondary battery including the electrolytic solution having a lithium salt concentration in a range of 1.5 to 3 mol/L, or further, in a range of 1.8 to 3 mol/L, is considered to exhibit an excellent effect in terms of resistance change. In particular, the lithium ion secondary battery including the electrolytic solution having a lithium salt concentration in a range of 1.8 to 2.2 mol/L is considered to exhibit a significantly excellent effect in terms of resistance change.

Production Example 4-1

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 4-1 containing $(FSO_2)_2NLi$ at a concentration of 1.0 mol/L and containing $LiPF_6$ at a concentration of 1.0 mol/L was produced. In the electrolytic solution of Production Example 4-1, the concentration of the lithium salt is 2.0 mol/L, and the ratio P of the moles of the alkali metal salt relative to the total moles of the first lithium salt and the alkali metal salt is 0.5.

Production Example 4-2

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 4-2 containing $(FSO_2)_2NLi$ at a concentration of 1.2 mol/L and containing $LiPF_6$ at a concentration of 0.8 mol/L was produced. In the electrolytic solution of Production Example 4-2, the concentration of the lithium salt is 2.0 mol/L, and the ratio P of the moles of the alkali metal salt relative to the total moles of the first lithium salt and the alkali metal salt is 0.4.

Production Example 4-3

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 4-3 containing $(FSO_2)_2NLi$ at a concentration of 1.4 mol/L and containing $LiPF_6$ at a concentration of 0.6 mol/L was produced. In the electrolytic solution of Production Example 4-3, the concentration of the lithium salt is 2.0 mol/L, and the ratio P of the moles of the alkali metal salt relative to the total moles of the first lithium salt and the alkali metal salt is 0.3.

Production Example 4-4

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 9:1, whereby an electrolytic solution of Production Example 4-4 containing $(FSO_2)_2NLi$ at a concentration of 1.2 mol/L and containing $LiPF_6$ at a concentration of 1.2 mol/L was produced. In the electrolytic solution of Production Example 4-4, the concentration of the lithium salt is 2.4 mol/L, and the ratio P of the moles of the alkali metal salt relative to the total moles of the first lithium salt and the alkali metal salt is 0.5.

Production Example 4-5

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 4-5 containing $(FSO_2)_2NLi$ at a concentration of 1.0 mol/L and containing $LiPF_6$ at a concentration of 1.0 mol/L was produced. In the electrolytic solution of Production Example 4-5, the concentration of the lithium salt is 2.0 mol/L, and the ratio P of the moles of the alkali metal salt relative to the total moles of the first lithium salt and the alkali metal salt is 0.5.

Production Example 4-6

$(FSO_2)_2NLi$ serving as the first lithium salt and $LiPF_6$ and $LiPF_2(OCOCOO)_2$ each serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 4-6 containing $(FSO_2)_2NLi$ at a concentration of 1.0 mol/L, containing $LiPF_6$ at a concentration of 1.0 mol/L, and containing $LiPF_2(OCOCOO)_2$ at a concentration of 0.05 mol/L was produced. In the electrolytic solution of Production Example 4-6, the concentration of the lithium salt is 2.05 mol/L, and the ratio P of the moles of the alkali metal salt relative to the total moles of the first lithium salt and the alkali metal salt is 0.51.

Production Example 4-7

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 4-7 containing $(FSO_2)_2NLi$ at a concentration of 2.0 mol/L and containing $LiPF_6$ at a concentration of 0.1 mol/L was produced. In the electrolytic solution of Production Example 4-7, the concentration of the lithium salt is 2.1 mol/L, and the ratio P of the moles of the alkali metal salt relative to the total moles of the first lithium salt and the alkali metal salt is 0.048.

Production Example 4-8

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 4-8 containing $(FSO_2)_2NLi$ at a concentration of 1.4 mol/L and containing $LiPF_6$ at a concentration of 1.0 mol/L was produced. In the electrolytic solution of Production Example 4-8, the concentration of the lithium salt is 2.4 mol/L, and the ratio P of the moles of the alkali metal salt relative to the total moles of the first lithium salt and the alkali metal salt is 0.42.

Production Example 4-9

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate at a mole ratio of 7:3, whereby an electrolytic solution of Production Example 4-9 containing $(FSO_2)_2NLi$ at a concentration of 1.1 mol/L and containing $LiPF_6$ at a concentration of 0.9 mol/L was produced. In the electrolytic solution of Production Example 4-9, the concentration of the lithium salt is 2.0 mol/L, and the ratio P of the moles of the alkali metal salt relative to the total moles of the first lithium salt and the alkali metal salt is 0.45.

Production Example 4-10

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 4-10 containing $(FSO_2)_2NLi$ at a concentration of 2.0 mol/L and containing $LiPF_6$ at a concentration of 0.2 mol/L was produced. In the electrolytic solution of Production Example 4-10, the concentration of the lithium salt is 2.2 mol/L, and the ratio P of the moles of the alkali metal salt relative to the total moles of the first lithium salt and the alkali metal salt is 0.09.

Production Example 4-11

$(FSO_2)_2NLi$ serving as the first lithium salt and $LiPF_6$ serving as the alkali metal salt and also as the second lithium salt were dissolved in a mixed solvent obtained by mixing dimethyl carbonate and ethyl methyl carbonate each serving as the linear carbonate and fluoroethylene carbonate serving as the fluorine-containing cyclic carbonate at a mole ratio of 63:27:10, whereby an electrolytic solution of Production Example 4-11 containing $(FSO_2)_2NLi$ at a concentration of 2.0 mol/L and containing $LiPF_6$ at a concentration of 0.3 mol/L was produced. In the electrolytic solution of Production Example 4-11, the concentration of the lithium salt is 2.3 mol/L, and the ratio P of the moles of the alkali metal salt relative to the total moles of the first lithium salt and the alkali metal salt is 0.13.

Table 8 shows the list of the electrolytic solutions of Production Examples 4-1 to 4-11.

TABLE 8

| Electrolytic solution | First lithium salt (mol/L) | Second lithium salt (mol/L) | Lithium salt (mol/L) | P | Solvent |
|---|---|---|---|---|---|
| Production Example 4-1 | 1.0 | 1.0 | 2.0 | 0.5 | DMC, EMC |
| Production Example 4-2 | 1.2 | 0.8 | 2.0 | 0.4 | DMC, EMC |
| Production Example 4-3 | 1.4 | 0.6 | 2.0 | 0.3 | DMC, EMC |
| Production Example 4-4 | 1.2 | 1.2 | 2.4 | 0.5 | DMC, EMC |
| Production Example 4-5 | 1.0 | 1.0 | 2.0 | 0.5 | DMC, EMC, FEC |
| Production Example 4-6 | 1.0 | 1.05 | 2.05 | 0.51 | DMC, EMC, FEC |
| Production Example 4-7 | 2.0 | 0.1 | 2.1 | 0.048 | DMC, EMC, FEC |
| Production Example 4-8 | 1.4 | 1.0 | 2.4 | 0.42 | DMC, EMC |
| Production Example 4-9 | 1.1 | 0.9 | 2.0 | 0.45 | DMC, EMC |
| Production Example 4-10 | 2.0 | 0.2 | 2.2 | 0.09 | DMC, EMC, FEC |
| Production Example 4-11 | 2.0 | 0.3 | 2.3 | 0.13 | DMC, EMC, FEC |

Examples 4-1 to 4-11

Lithium ion secondary batteries of Examples 4-1 to 4-11 were produced in the following manner using the electrolytic solutions of Production Examples 4-1 to 4-11.

94 parts by mass of a lithium metal complex oxide, 3 parts by mass of acetylene black serving as the conductive additive, and 3 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 15 μm was prepared. The slurry was applied in a film form on both surfaces of the aluminum foil. The aluminum foil on which the slurry was applied was dried in a furnace at 120° C. to remove N-methyl-2-pyrrolidone by volatilization. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode.

72.5 parts by mass of a silicon material coated with carbon, 13.5 parts by mass of acetylene black serving as the conductive additive, 14 parts by mass of a mixture of polyacrylic acid and 4,4'-diaminodiphenylmethane serving as the binding agent were mixed. This mixture was dispersed in a proper amount of N-methyl-2-pyrrolidone to create a slurry. As the negative electrode current collector, a copper foil having a thickness of 10 μm was prepared. The slurry was applied in a film form on both surfaces of the copper foil. The copper foil on which the slurry was applied was dried to remove N-methyl-2-pyrrolidone. Then, the copper foil was pressed to obtain a joined object. The obtained joined object was dried in a vacuum dryer to obtain a copper foil having a negative electrode active material layer formed thereon. This was used as the negative electrode.

Dehydration reaction proceeds by the drying in the mixture of polyacrylic acid and 4,4'-diaminodiphenylmethane, which were used as the binding agents, so that the mixture changed into a crosslinked polymer in which polyacrylic acid is crosslinked by 4,4'-diaminodiphenylmethane.

As the separator, a microporous film made from polyolefin and having a thickness of 20 μm was prepared.

An electrode assembly of negative electrode-separator-positive electrode-separator-negative electrode-separator-positive electrode-separator-negative electrode was produced by using the above positive electrode, negative electrode, and separator. The electrode assembly was covered with a set of two sheets of a laminate film. The laminate film was formed into a bag-like shape by having three sides thereof sealed, and the electrolytic solution of each Production Example was poured into the laminate film. Four sides were sealed airtight by sealing the remaining one side to obtain a lithium ion secondary battery in which the electrode assembly and the electrolytic solution were sealed. These batteries were used as the lithium ion secondary batteries of Examples 4-1 to 4-11.

Evaluation Example 4

Each lithium ion secondary battery was charged to 3.9 V at 0.05C rate at 25° C. Next, the temperature of each lithium ion secondary battery was increased to 60° C. and kept for 20 hours. Next, each lithium ion secondary battery was charged to 4.28 V at 0.05C rate at 25° C., and this voltage was kept for 1 hour. Next, each lithium ion secondary battery was discharged to 2.8 V at 1C rate at 25° C., and this voltage was kept for 4 hours. Thereafter, each lithium ion secondary battery was disassembled, the state of the aluminum foil, which is the positive electrode current collector, was observed. The results are shown in Table 9. In Table 9, when an aluminum foil that was corroded such that a hole was formed therein was observed, Al corrosion was determined to have occurred.

TABLE 9

|  | First lithium salt (mol/L) | Second lithium salt (mol/L) | Lithium salt (mol/L) | P | Solvent | Al corrosion |
|---|---|---|---|---|---|---|
| Example 4-1 | 1.0 | 1.0 | 2.0 | 0.5 | DMC, EMC | None |
| Example 4-2 | 1.2 | 0.8 | 2.0 | 0.4 | DMC, EMC | Occurred |
| Example 4-3 | 1.4 | 0.6 | 2.0 | 0.3 | DMC, EMC | Occurred |
| Example 4-4 | 1.2 | 1.2 | 2.4 | 0.5 | DMC, EMC | None |
| Example 4-5 | 1.0 | 1.0 | 2.0 | 0.5 | DMC, EMC, FEC | None |
| Example 4-6 | 1.0 | 1.05 | 2.05 | 0.51 | DMC, EMC, FEC | None |
| Example 4-7 | 2.0 | 0.1 | 2.1 | 0.048 | DMC, EMC, FEC | Occurred |
| Example 4-8 | 1.4 | 1.0 | 2.4 | 0.42 | DMC, EMC | None |
| Example 4-9 | 1.1 | 0.9 | 2.0 | 0.45 | DMC, EMC | Occurred |
| Example 4-10 | 2.0 | 0.2 | 2.2 | 0.09 | DMC, EMC, FEC | Occurred |
| Example 4-11 | 2.0 | 0.3 | 2.3 | 0.13 | DMC, EMC, FEC | Occurred |

In view of all the results, aluminum corrosion is considered to be suitably suppressed regardless of the concentration of the first lithium salt when the concentration of the second lithium salt is not less than 1.0 mol/L in the electrolytic solution of the present invention.

The invention claimed is:

1. A lithium ion secondary battery comprising: a positive electrode including a current collector made from aluminum; a negative electrode; and an electrolytic solution, wherein the positive electrode contains $Li_aNi_bCo_cMn_dD_eO_f$ ($0.2 \leq a \leq 1.2$; $b+c+d+e=1$; $0 \leq e < 1$; D is at least one element selected from Li, Fe, Cr, Cu, Zn, Ca, Mg, S, Si, Na, K, Al, Zr, Ti, P, Ga, Ge, V, Mo, Nb, W, or La; $1.7 < f < 2.1$) as a positive electrode active material, the negative electrode contains a graphite or a material including silicon, as a negative electrode active material, and the electrolytic solution contains an electrolyte including a lithium salt, and a linear carbonate represented by general formula (2) below, the lithium salt includes both a first lithium and a second lithium salt, the first lithium salt is $(FSO_2)_2NLi$, the second lithium salt is $LiPF_6$, and the lithium salt has a concentration of 1.8 to 3 mol/L, $$R^{20}OCOOR^{21} \quad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof; "n" is an integer not smaller than 1, "m" is an integer not smaller than 3, and "a", "b", "c", "d", "e", "f", "g", "h", "i", and "j" are each independently an integer not smaller than 0, and satisfy $2n+1=a+b+c+d+e$ and $2m-1=f+g+h+i+j$), and a ratio P of moles of the second lithium salt relative to total moles of the first lithium salt and the second lithium salt satisfies $0.4 \leq P < 0.7$.

2. The lithium ion secondary battery according to claim 1, wherein the electrolytic solution contains a fluorine-containing cyclic carbonate.

3. The lithium ion secondary battery according to claim 1, wherein
the second lithium salt has a concentration of not less than 1.0 mol/L.

4. The lithium ion secondary battery according to claim 1, wherein
a mole ratio of the linear carbonate relative to the lithium salt is in a range of 3 to 5.

5. The lithium ion secondary battery according to claim 1, wherein the linear carbonate is contained in the electrolytic solution by not less than 80 mass %.

6. The lithium ion secondary battery according to claim 1, wherein the ratio P of moles of the second lithium salt relative to total moles of the first lithium salt and the second lithium salt satisfies $0.4 \leq P \leq 0.5$.

* * * * *